US010819530B2

(12) United States Patent
Maes

(10) Patent No.: US 10,819,530 B2
(45) Date of Patent: Oct. 27, 2020

(54) CHARGING ENABLER

(75) Inventor: Stéphane H. Maes, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 12/544,484

(22) Filed: Aug. 20, 2009

(65) Prior Publication Data

US 2010/0049640 A1 Feb. 25, 2010

Related U.S. Application Data

(60) Provisional application No. 61/090,648, filed on Aug. 21, 2008.

(51) Int. Cl.
H04L 12/14 (2006.01)
G06Q 30/04 (2012.01)
(Continued)

(52) U.S. Cl.
CPC ............. H04L 12/14 (2013.01); G06Q 10/06 (2013.01); G06Q 30/04 (2013.01);
(Continued)

(58) Field of Classification Search
CPC ......... H04L 12/14; H04L 47/20; H04L 47/10; H04L 12/1403; G06Q 30/04; G06Q 10/06
See application file for complete search history.

(56) References Cited

U.S. PATENT DOCUMENTS 5,414,812 A 5/1995 Filip et al.
5,613,060 A 3/1997 Britton et al.
(Continued)

FOREIGN PATENT DOCUMENTS

EP 2 034 748 A1 3/2009
WO 2007134468 A1 11/2007
(Continued)

OTHER PUBLICATIONS

Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.
(Continued)

Primary Examiner — Florian M Zeender
Assistant Examiner — Nicole Elena Bruner
(74) Attorney, Agent, or Firm — Kraguljac Law Group, LLC

(57) ABSTRACT

Embodiments of the invention provide systems and methods for providing charging functions. According to one embodiment, a method of charging for services on a communication network can comprise receiving a request to perform a charging function from an application via a northbound interface of a charging enabler. The northbound interface can provide an abstract interface for invoking one or more of a plurality of charging functions. The charging function can be requested from a network resource via a southbound interface of the charging enabler. The southbound interface can provide an interface specific to the network resource. Results of the charging function can be received from the network resource via the southbound interface of the charging enabler and returned to the application via the northbound interface of the charging enabler.

37 Claims, 8 Drawing Sheets

(51) Int. Cl.
   *G06Q 10/06* (2012.01)
   *H04L 12/813* (2013.01)
   *H04L 12/801* (2013.01)
   *H04W 4/24* (2018.01)
   *H04M 15/00* (2006.01)

(52) U.S. Cl.
   CPC .......... *H04L 12/1403* (2013.01); *H04L 47/10* (2013.01); *H04L 47/20* (2013.01); *H04M 15/55* (2013.01); *H04W 4/24* (2013.01)

(56) References Cited

U.S. PATENT DOCUMENTS

| | | |
|---|---|---|
| 5,699,513 A | 12/1997 | Feigen et al. |
| 5,737,321 A | 4/1998 | Takahashi |
| 5,786,770 A | 7/1998 | Thompson |
| 5,850,517 A | 12/1998 | Verkler et al. |
| 5,867,665 A | 2/1999 | Butman et al. |
| 5,946,634 A | 8/1999 | Korpela |
| 6,115,690 A | 9/2000 | Wong |
| 6,119,104 A | 9/2000 | Brumbelow |
| 6,128,645 A | 10/2000 | Butman et al. |
| 6,157,941 A | 12/2000 | Verkler et al. |
| 6,163,800 A | 12/2000 | Ejiri |
| 6,192,231 B1 | 2/2001 | Chapman et al. |
| 6,192,414 B1 | 2/2001 | Horn |
| 6,230,271 B1 | 5/2001 | Wadlow et al. |
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |
| 6,463,462 B1 | 10/2002 | Smith et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |
| 6,611,867 B1 | 8/2003 | Bowman-Amuah |
| 6,633,560 B1 | 10/2003 | Albert et al. |
| 6,748,570 B1 | 6/2004 | Bahrs et al. |
| 6,792,605 B1 | 9/2004 | Roberts et al. |
| 6,813,278 B1 | 11/2004 | Swartz et al. |
| 6,823,338 B1 | 11/2004 | Byrne et al. |
| 6,868,413 B1 | 3/2005 | Grindrod et al. |
| 6,941,465 B1 | 9/2005 | Palekar et al. |
| 6,965,902 B1 | 11/2005 | Ghatate |
| 6,978,348 B2 | 12/2005 | Belknap et al. |
| 6,981,023 B1 | 12/2005 | Hamilton et al. |
| 6,985,939 B2 | 1/2006 | Fletcher et al. |
| 6,990,491 B2 | 1/2006 | Dutta et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,051,092 B2 | 5/2006 | Lenz et al. |
| 7,072,653 B1 | 7/2006 | Sladek et al. |
| 7,073,055 B1 | 7/2006 | Freed et al. |
| 7,089,317 B2 | 8/2006 | Jeyaraman et al. |
| 7,092,385 B2 | 8/2006 | Gallant et al. |
| 7,106,848 B1 | 9/2006 | Barlow et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,133,669 B2 | 11/2006 | Nair et al. |
| 7,143,092 B1 | 11/2006 | Arroyo et al. |
| 7,143,094 B2 | 11/2006 | Arroyo et al. |
| 7,146,616 B2 | 12/2006 | Dorner et al. |
| 7,185,333 B1 | 2/2007 | Shafron |
| 7,185,342 B1 | 2/2007 | Carrer et al. |
| 7,194,482 B2 | 3/2007 | Larkin et al. |
| 7,222,148 B2 | 5/2007 | Potter et al. |
| 7,222,334 B2 | 5/2007 | Casati et al. |
| 7,266,600 B2 | 9/2007 | Fletcher et al. |
| 7,269,162 B1 | 9/2007 | Turner |
| 7,269,431 B1 | 9/2007 | Gilbert |
| 7,272,625 B1 | 9/2007 | Hannel et al. |
| 7,281,029 B2 | 10/2007 | Rawat |
| 7,295,532 B2 | 11/2007 | Haller et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,443,972 B1 | 10/2008 | Barlow et al. |
| 7,444,620 B2 | 10/2008 | Marvin |
| 7,447,793 B2 | 11/2008 | Morioka |
| 7,448,022 B1 | 11/2008 | Ram et al. |
| 7,454,399 B2 | 11/2008 | Matichuk |
| 7,461,062 B2 | 12/2008 | Stewart et al. |
| 7,467,384 B2 | 12/2008 | Brubacher et al. |
| 7,472,349 B1 | 12/2008 | Srivastava et al. |
| 7,478,416 B2 | 1/2009 | Edson |
| 7,519,076 B2 | 4/2009 | Janssen et al. |
| 7,580,994 B1 * | 8/2009 | Fiszman et al. ............. 709/223 |
| 7,590,696 B1 | 9/2009 | Odell et al. |
| 7,617,521 B2 | 11/2009 | Maes |
| 7,630,953 B2 | 12/2009 | Stauber et al. |
| 7,644,145 B2 | 1/2010 | Rockwell |
| 7,660,297 B2 | 2/2010 | Fisher et al. |
| 7,676,813 B2 | 3/2010 | Bisset et al. |
| 7,702,792 B2 | 4/2010 | Shaffer et al. |
| 7,716,310 B2 | 5/2010 | Foti |
| 7,720,926 B2 | 5/2010 | Asahara |
| 7,730,129 B2 | 6/2010 | Wang et al. |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 | 1/2011 | Sonalkar et al. |
| 7,873,316 B2 | 1/2011 | Maes |
| 7,873,716 B2 | 1/2011 | Maes |
| 7,904,909 B1 | 3/2011 | Reiner et al. |
| 7,925,727 B2 | 4/2011 | Sullivan et al. |
| 7,933,397 B2 | 4/2011 | Jain |
| 8,023,971 B2 | 9/2011 | Egli |
| 8,027,921 B1 | 9/2011 | Boydstun et al. |
| 8,032,920 B2 | 10/2011 | Maes |
| 8,036,362 B1 | 10/2011 | Skinner |
| 8,060,067 B2 | 11/2011 | Tarleton et al. |
| 8,068,860 B1 | 11/2011 | Midkiff |
| 8,073,810 B2 | 12/2011 | Maes |
| 8,086,665 B1 | 12/2011 | Soukup et al. |
| 8,090,848 B2 | 1/2012 | Maes |
| 8,114,555 B2 | 2/2012 | Leonida et al. |
| 8,121,278 B2 | 2/2012 | Leigh et al. |
| 8,161,171 B2 | 4/2012 | Maes |
| 8,214,503 B2 | 7/2012 | Maes |
| 8,223,951 B1 | 7/2012 | Edelhaus et al. |
| 8,230,449 B2 | 7/2012 | Maes |
| 8,255,470 B2 | 8/2012 | Jackson et al. |
| 8,321,498 B2 | 11/2012 | Maes |
| 8,321,594 B2 | 11/2012 | Maes et al. |
| 8,335,862 B2 | 12/2012 | Fletcher et al. |
| 8,370,506 B2 | 2/2013 | Maes |
| 8,386,609 B2 | 2/2013 | Anand et al. |
| 8,401,009 B1 | 3/2013 | Dorsey et al. |
| 8,401,022 B2 | 3/2013 | Maes et al. |
| 8,458,703 B2 | 6/2013 | Maes |
| 8,478,311 B2 | 7/2013 | Sennett et al. |
| 8,505,067 B2 | 8/2013 | Maes |
| 8,533,773 B2 | 9/2013 | Maes |
| 8,539,097 B2 | 9/2013 | Maes |
| 8,543,665 B2 | 9/2013 | Ansari et al. |
| 8,589,338 B2 | 11/2013 | Maes |
| 8,675,852 B2 | 3/2014 | Maes |
| 8,676,155 B2 | 3/2014 | Fan et al. |
| 8,744,055 B2 | 6/2014 | Maes |
| 8,849,685 B2 | 9/2014 | Oden |
| 8,879,547 B2 | 11/2014 | Maes |
| 8,914,493 B2 | 12/2014 | Maes et al. |
| 8,918,493 B1 | 12/2014 | Beach et al. |
| 8,966,498 B2 | 2/2015 | Maes |
| 9,038,082 B2 | 5/2015 | Maes |

(56) References Cited

U.S. PATENT DOCUMENTS

| | | | |
|---|---|---|---|
| 9,083,599 B2 | 7/2015 | Huuhtanen et al. |
| 9,088,570 B2 | 7/2015 | Anderson et al. |
| 9,245,236 B2 | 1/2016 | Maes |
| 9,269,060 B2 | 2/2016 | Maes |
| 9,503,407 B2 | 11/2016 | Maes |
| 9,509,790 B2 | 11/2016 | Maes |
| 2001/0010053 A1 | 7/2001 | Ben-Shachar et al. |
| 2001/0016880 A1 | 8/2001 | Cai et al. |
| 2001/0028649 A1 | 10/2001 | Pogossiants et al. |
| 2002/0002684 A1 | 1/2002 | Fox et al. |
| 2002/0004827 A1 | 1/2002 | Ciscon et al. |
| 2002/0075844 A1 | 6/2002 | Hagen |
| 2002/0087674 A1 | 7/2002 | Guilford et al. |
| 2002/0099738 A1 | 7/2002 | Grant |
| 2002/0101879 A1 | 8/2002 | Bouret |
| 2002/0104015 A1 | 8/2002 | Barzilai et al. |
| 2002/0111848 A1 | 8/2002 | White |
| 2002/0120697 A1 | 8/2002 | Generous et al. |
| 2002/0120729 A1 | 8/2002 | Faccin et al. |
| 2002/0143819 A1 | 10/2002 | Han et al. |
| 2002/0144119 A1 | 10/2002 | Benantar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0004746 A1 | 1/2003 | Kheirolomoom et al. |
| 2003/0005034 A1 | 1/2003 | Amin |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0061404 A1 | 3/2003 | Atwal et al. |
| 2003/0115203 A1 | 6/2003 | Brown et al. |
| 2003/0115260 A1 | 6/2003 | Edge |
| 2003/0118167 A1 | 6/2003 | Sammon et al. |
| 2003/0120502 A1 | 6/2003 | Robb et al. |
| 2003/0131069 A1 | 7/2003 | Lucovsky et al. |
| 2003/0131076 A1 | 7/2003 | Nelson et al. |
| 2003/0135553 A1 | 7/2003 | Pendakur |
| 2003/0140115 A1 | 7/2003 | Mehra |
| 2003/0140131 A1 | 7/2003 | Chandrashekhar et al. |
| 2003/0154233 A1 | 8/2003 | Patterson |
| 2003/0182550 A1 | 9/2003 | Chen et al. |
| 2003/0185233 A1 | 10/2003 | Ji et al. |
| 2003/0191769 A1 | 10/2003 | Crisan et al. |
| 2003/0191823 A1 | 10/2003 | Bansal et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0019695 A1 | 1/2004 | Fellenstein et al. |
| 2004/0024720 A1 | 2/2004 | Fairweather |
| 2004/0044647 A1 | 3/2004 | Salmenkaita |
| 2004/0054718 A1 | 3/2004 | Hicks, III et al. |
| 2004/0064528 A1 | 4/2004 | Meredith et al. |
| 2004/0068586 A1 | 4/2004 | Xie et al. |
| 2004/0093381 A1 | 5/2004 | Hodges et al. |
| 2004/0093593 A1 | 5/2004 | Jhanwar et al. |
| 2004/0100923 A1 | 5/2004 | Yam |
| 2004/0110493 A1 | 6/2004 | Alvarez et al. |
| 2004/0125758 A1 | 7/2004 | Hayduk |
| 2004/0128546 A1 | 7/2004 | Blakley et al. |
| 2004/0133627 A1 | 7/2004 | Kalyanaraman et al. |
| 2004/0139319 A1 | 7/2004 | Favazza et al. |
| 2004/0148334 A1 | 7/2004 | Arellano et al. |
| 2004/0153545 A1 | 8/2004 | Pandya et al. |
| 2004/0161090 A1 | 8/2004 | Digate et al. |
| 2004/0162881 A1 | 8/2004 | Digate et al. |
| 2004/0176988 A1 | 9/2004 | Boughannam |
| 2004/0221005 A1 | 11/2004 | Albaugh et al. |
| 2005/0004974 A1 | 1/2005 | Sharma et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0068167 A1 | 3/2005 | Boyer et al. |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0114533 A1 | 5/2005 | Hullfish et al. |
| 2005/0125696 A1 | 6/2005 | Afshar et al. |
| 2005/0132086 A1 | 6/2005 | Flurry et al. |
| 2005/0141691 A1 | 6/2005 | Wengrovitz |
| 2005/0144557 A1 | 6/2005 | Li et al. |
| 2005/0172027 A1 | 8/2005 | Castellanos et al. |
| 2005/0193269 A1 | 9/2005 | Haswell et al. |
| 2005/0204391 A1 | 9/2005 | Hunleth et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0021010 A1 | 1/2006 | Atkins et al. |
| 2006/0031441 A1 | 2/2006 | Davis et al. |
| 2006/0031559 A1 | 2/2006 | Sorokopud et al. |
| 2006/0036689 A1 | 2/2006 | Buford et al. |
| 2006/0041669 A1 | 2/2006 | Bemmel et al. |
| 2006/0047753 A1 | 3/2006 | Pal |
| 2006/0048159 A1 | 3/2006 | Yazawa et al. |
| 2006/0053227 A1 | 3/2006 | Ye et al. |
| 2006/0072474 A1 | 4/2006 | Mitchell |
| 2006/0080117 A1 | 4/2006 | Carr et al. |
| 2006/0104306 A1 | 5/2006 | Adamczyk et al. |
| 2006/0104431 A1 | 5/2006 | Emery et al. |
| 2006/0112400 A1 | 5/2006 | Zhang et al. |
| 2006/0116912 A1 | 6/2006 | Maes |
| 2006/0117109 A1 | 6/2006 | Maes |
| 2006/0117376 A1 | 6/2006 | Maes |
| 2006/0136560 A1 | 6/2006 | Jiang |
| 2006/0143622 A1 | 6/2006 | Prabandham et al. |
| 2006/0143686 A1 | 6/2006 | Maes |
| 2006/0146792 A1 | 7/2006 | Ramachandran et al. |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0205393 A1 | 9/2006 | Veen |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 | 1/2007 | Otokawa et al. |
| 2007/0011322 A1 | 1/2007 | Moiso |
| 2007/0027975 A1 | 2/2007 | Tai et al. |
| 2007/0047534 A1 | 3/2007 | Hakusui |
| 2007/0061397 A1 | 3/2007 | Gregorat et al. |
| 2007/0071224 A1 | 3/2007 | Shtivelman et al. |
| 2007/0088836 A1 | 4/2007 | Tai et al. |
| 2007/0099613 A1 | 5/2007 | Burgan et al. |
| 2007/0100831 A1 | 5/2007 | Cox |
| 2007/0100830 A1* | 5/2007 | Adamczyk et al. .......... 709/223 |
| 2007/0112574 A1 | 5/2007 | Greene |
| 2007/0117556 A1 | 5/2007 | Rogalski |
| 2007/0118618 A1 | 5/2007 | Kisel et al. |
| 2007/0118648 A1 | 5/2007 | Millefiorini et al. |
| 2007/0118662 A1 | 5/2007 | Vishwanathan et al. |
| 2007/0121539 A1 | 5/2007 | Kikuchi |
| 2007/0123297 A1 | 5/2007 | Chan et al. |
| 2007/0150480 A1 | 6/2007 | Hwang et al. |
| 2007/0150936 A1 | 6/2007 | Maes |
| 2007/0173226 A1* | 7/2007 | Cai et al. ................ 455/405 |
| 2007/0182541 A1 | 8/2007 | Harris et al. |
| 2007/0189466 A1 | 8/2007 | Croak et al. |

(56) References Cited

U.S. PATENT DOCUMENTS

| | | |
|---|---|---|
| 2007/0192374 A1 | 8/2007 | Abnous et al. |
| 2007/0192465 A1 | 8/2007 | Modarressi |
| 2007/0197227 A1 | 8/2007 | Naqvi et al. |
| 2007/0198982 A1 | 8/2007 | Bolan et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0223462 A1 | 9/2007 | Hite et al. |
| 2007/0223671 A1 | 9/2007 | Lee |
| 2007/0233883 A1 | 10/2007 | De Lutiis et al. |
| 2007/0239866 A1 | 10/2007 | Cox et al. |
| 2007/0255662 A1 | 11/2007 | Tumminaro |
| 2007/0271554 A1 | 11/2007 | Fletcher et al. |
| 2007/0276907 A1 | 11/2007 | Maes |
| 2007/0291859 A1 | 11/2007 | Maes |
| 2007/0280226 A1 | 12/2007 | Sonalkar et al. |
| 2008/0013533 A1 | 1/2008 | Bogineni et al. |
| 2008/0025243 A1 | 1/2008 | Corneille et al. |
| 2008/0037747 A1 | 2/2008 | Tucker |
| 2008/0043975 A1 | 2/2008 | Miloslavsky et al. |
| 2008/0049929 A1 | 2/2008 | Miloslavsky et al. |
| 2008/0080479 A1 | 4/2008 | Maes |
| 2008/0085712 A1 | 4/2008 | Han |
| 2008/0095326 A1 | 4/2008 | Qi et al. |
| 2008/0109853 A1 | 5/2008 | Einarsson et al. |
| 2008/0126541 A1 | 5/2008 | Rosenberg et al. |
| 2008/0127232 A1 | 5/2008 | Langen et al. |
| 2008/0147799 A1 | 6/2008 | Morris |
| 2008/0151768 A1 | 6/2008 | Liu |
| 2008/0151918 A1 | 6/2008 | Foti |
| 2008/0162637 A1 | 7/2008 | Adamczyk et al. |
| 2008/0163235 A1 | 7/2008 | Marvin et al. |
| 2008/0168523 A1 | 7/2008 | Ansari et al. |
| 2008/0171549 A1 | 7/2008 | Hursey et al. |
| 2008/0172482 A1 | 7/2008 | Shah |
| 2008/0175251 A1 | 7/2008 | Oouchi et al. |
| 2008/0175357 A1 | 7/2008 | Tucker |
| 2008/0186845 A1 | 8/2008 | Maes |
| 2008/0189401 A1 | 8/2008 | Maes |
| 2008/0201705 A1 | 8/2008 | Wookey |
| 2008/0201715 A1 | 8/2008 | Breiter et al. |
| 2008/0212762 A1 | 9/2008 | Gray et al. |
| 2008/0222694 A1 | 9/2008 | Nakae |
| 2008/0228919 A1 | 9/2008 | Doshi et al. |
| 2008/0232567 A1 | 9/2008 | Maes |
| 2008/0235230 A1 | 9/2008 | Maes |
| 2008/0235327 A1 | 9/2008 | Maes et al. |
| 2008/0235354 A1 | 9/2008 | Maes |
| 2008/0235380 A1 | 9/2008 | Maes |
| 2008/0253543 A1 | 10/2008 | Aharon |
| 2008/0271039 A1 | 10/2008 | Rolia et al. |
| 2008/0275883 A1 | 11/2008 | Ashraf et al. |
| 2008/0281607 A1 | 11/2008 | Sajja et al. |
| 2008/0288966 A1 | 11/2008 | Maes |
| 2008/0292074 A1 | 11/2008 | Boni et al. |
| 2008/0293389 A1 | 11/2008 | Chin et al. |
| 2008/0301135 A1 | 12/2008 | Alves et al. |
| 2008/0307108 A1 | 12/2008 | Yan et al. |
| 2008/0313648 A1 | 12/2008 | Wang et al. |
| 2009/0003362 A1 | 1/2009 | Pattabhiraman et al. |
| 2009/0006360 A1 | 1/2009 | Liao et al. |
| 2009/0015433 A1 | 1/2009 | James et al. |
| 2009/0022072 A1 | 1/2009 | Zhu et al. |
| 2009/0022286 A1 | 1/2009 | Brunson et al. |
| 2009/0034426 A1 | 2/2009 | Luft et al. |
| 2009/0061404 A1 | 3/2009 | Toly |
| 2009/0086950 A1 | 4/2009 | Vendrow et al. |
| 2009/0093240 A1 | 4/2009 | Lang |
| 2009/0106677 A1 | 4/2009 | Son et al. |
| 2009/0109959 A1 | 4/2009 | Elliott et al. |
| 2009/0112875 A1 | 4/2009 | Maes |
| 2009/0119303 A1 | 5/2009 | Rio et al. |
| 2009/0119672 A1 | 5/2009 | Bussard et al. |
| 2009/0125595 A1 | 5/2009 | Maes |
| 2009/0132220 A1 | 5/2009 | Chakraborty et al. |
| 2009/0132717 A1 | 5/2009 | Maes |
| 2009/0154681 A1 | 6/2009 | Kung et al. |
| 2009/0180440 A1 | 7/2009 | Sengupta et al. |
| 2009/0185576 A1 | 7/2009 | Kisel et al. |
| 2009/0187919 A1 | 7/2009 | Maes |
| 2009/0190603 A1 | 7/2009 | Damola et al. |
| 2009/0192992 A1 | 7/2009 | Arthursson |
| 2009/0193057 A1 | 7/2009 | Maes |
| 2009/0193433 A1 | 7/2009 | Maes |
| 2009/0201917 A1 | 8/2009 | Maes et al. |
| 2009/0222541 A1 | 9/2009 | Monga et al. |
| 2009/0222836 A1 | 9/2009 | Paval |
| 2009/0222858 A1 | 9/2009 | Hjelm et al. |
| 2009/0228584 A1 | 9/2009 | Maes et al. |
| 2009/0253434 A1 | 10/2009 | Hayashi et al. |
| 2009/0306834 A1 | 12/2009 | Hjelm et al. |
| 2009/0328051 A1 | 12/2009 | Maes |
| 2010/0037157 A1 | 2/2010 | Chang et al. |
| 2010/0049826 A1 | 2/2010 | Maes |
| 2010/0058436 A1 | 3/2010 | Maes |
| 2010/0070447 A1 | 3/2010 | Pfuntner et al. |
| 2010/0077082 A1 | 3/2010 | Hession et al. |
| 2010/0083285 A1 | 4/2010 | Bahat et al. |
| 2010/0091764 A1 | 4/2010 | Merino Gonzalez et al. |
| 2010/0128696 A1 | 5/2010 | Fantini et al. |
| 2010/0153865 A1 | 6/2010 | Barnes et al. |
| 2010/0179995 A1 | 7/2010 | Wang |
| 2010/0185772 A1 | 7/2010 | Wang et al. |
| 2010/0192004 A1 | 7/2010 | Bauchot et al. |
| 2010/0235844 A1 | 9/2010 | Arwe et al. |
| 2010/0281488 A1 | 11/2010 | Krishnamurthy et al. |
| 2011/0002452 A1* | 1/2011 | Van Der Laak ........ H04M 3/56 379/114.28 |
| 2011/0035443 A1 | 2/2011 | Jensen |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0134843 A1 | 6/2011 | Noldus et al. |
| 2011/0142211 A1 | 6/2011 | Maes |
| 2011/0145278 A1 | 6/2011 | Maes |
| 2011/0145347 A1 | 6/2011 | Maes |
| 2011/0182205 A1 | 7/2011 | Gerdes et al. |
| 2011/0258619 A1 | 10/2011 | Wookey |
| 2011/0280383 A1 | 11/2011 | Varga et al. |
| 2012/0045040 A1 | 2/2012 | Maes |
| 2012/0047506 A1 | 2/2012 | Maes |
| 2012/0106728 A1 | 5/2012 | Ghaffari et al. |
| 2012/0173745 A1 | 7/2012 | Maes |

FOREIGN PATENT DOCUMENTS

| | | |
|---|---|---|
| WO | 2008111027 | 12/2008 |
| WO | 2008146097 | 12/2008 |

OTHER PUBLICATIONS

O'Doherty, Phelim, "JSLEE—SIP Servlet", <http://java.sun.com/products/jain/JSLEE-SIPServlet.pdf, 2003, 13 pages.

The Parlay Group, "Specifications", <http://web.archive.org/web/20050114014707/www.parlay.org/specs/index.asp>, Jan. 14, 2005, 2 pages.

U.S. Appl. No. 11/926,738, filed Oct. 29, 2007, Advisory Action dated Sep. 3, 2010, 2 pages.

U.S. Appl. No. 11/926,738, filed Oct. 29, 2007, Office Action dated Nov. 10, 2010, 12 pages.

U.S. Appl. No. 12/019,299, filed Jan. 24, 2008, Advisory Action dated Dec. 9, 2010, 3 pages.

U.S. Appl. No. 12/019,299, filed Jan. 24, 2008, Office Action dated Jan. 24, 2011, 16 pages.

U.S. Appl. No. 10/855,999, filed May 28, 2004, Final Office Action dated Jan. 5, 2011, 19 pages.

U.S. Appl. No. 11/123,468, filed May 5, 2005, Advisory Action dated Jan. 18, 2011, 2 pages.

U.S. Appl. No. 12/364,642, filed Feb. 3, 2009, Office Action dated Dec. 20, 2010, 18 pages.

(56) References Cited

OTHER PUBLICATIONS

U.S. Appl. No. 11/357,653, filed Feb. 16, 200, Office Action dated Jan. 20, 2011, 18 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
U.S. Appl. No. 11/848,347, filed Aug. 31, 2007, Final Office Action dated Mar. 7, 2011, 21 pages.
U.S. Appl. No. 11/926,738, filed Oct. 29, 2007, Final Office Action dated Mar. 17, 2011, 13 pages.
U.S. Appl. No. 11/943,101, filed Nov. 20, 2007, Final Office Action dated Feb. 14, 2011, 11 pages.
U.S. Appl. No. 12/544,459, filed Aug. 20, 2009, Office Action dated Mar. 2, 2011, 10 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/939,705, filed Nov. 14, 2007, Final Office Action dated Mar. 17, 2011, 21 pages.
U.S. Appl. No. 11/024,160, filed Dec. 2004, Maes.
Andrews, Tony et al, Business Process Execution Language for Web Services, Version 1.1, BEA Systems, International Business Machines Corporation, SAP AG, Siebel Systems, May 5, 2003, 31 pages.
Liberty Architecture Overview, Liberty Alliance Project Version 1.1, Piscataway New Jersey, Jan. 15, 2003, 44 pages.
Maes, Stephanie, Multi-modal Web IBM Position W3C/WAP Workshop, IBM Research Human Language Technologies, downloaded http://www.w3.org on May 26, 2003, 9 pages.
Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, downloaded http://www.linktionary.com/policy.html on Aug. 2, 2004, 4 pages.
Seely, Scott, "XML and Web Services Security: Understanding WS-Security", Microsoft Corporation, 2002.
Simpson et al, Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm on May 26, 2003, 5 Pages.
Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.
Thomas Manes, Anne, "Registering a Web Service in UDDI", 2003.
U.S. Appl. No. 11/848,347, filed Aug. 31, 2007, Office Action dated Oct. 29, 2009, 12 pages.
U.S. Appl. No. 11/877,129, filed Oct. 23, 2007, Final Office Action dated Mar. 29, 2010, 17 pages.
U.S. Appl. No. 11/877,129, filed Oct. 23, 2007, Office Action dated Sep. 28, 2009, 15 pages.
U.S. Appl. No. 11/926,738, filed Oct. 29, 2007, Office Action dated Feb. 24, 2010, 12 pages.
U.S. Appl. No. 11/943,101, filed Nov. 20, 2007, Advisory Action dated Apr. 16, 2010, 3 pages.
U.S. Appl. No. 11/943,101, filed Nov. 20, 2007, Final Office Action dated Feb. 2, 2010, 9 pages.
U.S. Appl. No. 11/943,101, filed Nov. 20, 2007, Office Action dated Jul. 8, 2009, 9 pages.
U.S. Appl. No. 11/951,500, filed Dec. 6, 2007, Final Office Action dated Mar. 30, 2010, 26 pages.
U.S. Appl. No. 11/951,500, filed Dec. 6, 2007, Office Action dated Sep. 22, 2009, 24 pages.
U.S. Appl. No. 12/019,299, filed Jan. 24, 2008, Office Action dated Mar. 31, 2010, 13 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 11/848,347, filed Aug. 31, 2007, Final Office Action dated May 10, 2010, 15 pages.
U.S. Appl. No. 11/877,129, filed Oct. 23, 2007, Advisory Action dated Jun. 3, 2010, 2 pages.
U.S. Appl. No. 11/926,738, filed Oct. 29, 2007, Final Office dated Jun. 29, 2010, 12 pages.
U.S. Appl. No. 11/951,500, filed Dec. 6, 2007, Advisory Action dated Jun. 24, 2010, 2 pages.
U.S. Appl. No. 10/855,999, filed May 28, 2004, Office Action dated Jun. 24, 2010, 20 pages.
U.S. Appl. No. 12/045,220, filed Mar. 10, 2008, Advisory Action dated Jun. 11, 2010, 3 pages.
Burger, E. et al., "Deploying CCXML for Application-Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Romellini, C. et al., "CCXML: The Power of Standardization," Loquendo, Sep. 27, 2005.
U.S. Appl. No. 11/848,347, filed Aug. 31, 2007, Advisory Action dated Jul. 27, 2010, 3 pages.
U.S. Appl. No. 11/848,347, filed Aug. 31, 2007, Office Action dated Sep. 30, 2010, 19 pages.
U.S. Appl. No. 11/877,129, filed Oct. 23, 2007, Notice of Allowance dated Aug. 5, 2010, 6 pages.
U.S. Appl. No. 11/943,101, filed Nov. 20, 2007, Office Action dated Aug. 27, 2010, 11 pages.
U.S. Appl. No. 11/951,500, filed Dec. 6, 2007, Office Action dated Sep. 1, 2010, 30 pages.
U.S. Appl. No. 12/019,299, filed Jan. 24, 2008, Final Office Action dated Oct. 6, 2010, 20 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.

(56) References Cited

OTHER PUBLICATIONS

U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/070,317, filed Mar. 1, 2005, Final Office Action dated Sep. 27, 2010, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 10, 2010, 18 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance dated Aug. 18, 2010, 4 pages.
U.S. Appl. No. 11/939,705, filed Nov. 14, 2007, Office Action dated Oct. 4, 2010, 21 pages.
International Search Report and Written Opinion of PCT/US2010/037074 dated Jun. 1, 2011, 16 pages.
U.S. Appl. No. 11/848,347, filed Aug. 31, 2007, Advisory Action dated May 23, 2011, 3 pages.
U.S. Appl. No. 11/926,738, filed Oct. 29, 2007, Advisory Action dated May 25, 2011, 3 pages.
U.S. Appl. No. 11/943,101, filed Nov. 20, 2007, Advisory Action dated Apr. 28, 2011, 3 pages.
U.S. Appl. No. 11/951,500, filed Dec. 6, 2007, Final Office Action dated Apr. 14, 2011, 33 pages.
U.S. Appl. No. 11/024,160, filed Dec. 27, 2004, Final Office Action dated Jun. 1, 2011, 11 pages.
U.S. Appl. No. 12/019,335, filed Jan. 24, 2008, Office Action dated May 23, 2011, 18 pages.
U.S. Appl. No. 11/969,343, filed Jan. 4, 2008, Office Action dated Jun. 10, 2011, 13 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems, Jun. 1, 2001, 16 pages.
U.S. Appl. No. 11/848,347, filed Aug. 31, 2007, Notice of Allowance dated Mar. 2, 2012, 9 pages.
U.S. Appl. No. 11/926,738, filed Oct. 29, 2007, Notice of Allowance dated Aug. 5, 2011, 13 pages.
U.S. Appl. No. 11/943,101, filed Nov. 20, 2007, Office Action dated Jul. 28, 2011, 11 pages.
U.S. Appl. No. 11/943,101, filed Nov. 20, 2007, Notice of Allowance dated Dec. 9, 2011, 7 pages.
U.S. Appl. No. 11/951,500, filed Dec. 6, 2007, Advisory Action dated Jul. 15, 2011, 3 pages.
U.S. Appl. No. 11/951,500, filed Dec. 6, 2007, Office Action dated Apr. 11, 2012, 6 pages.
U.S. Appl. No. 11/070,317, filed Mar. 1, 2005, Office Action dated Mar. 15, 2012, 10 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action dated Sep. 28, 2011, 15 pages.
U.S. Appl. No. 11/939,705, filed Nov. 14, 2007, Final Office Action dated Mar. 15, 2012, 16 pages.
U.S. Appl. No. 12/045,220, filed Mar. 10, 2008, Final Office Action dated Mar. 15, 2012, 20 pages.
U.S. Appl. No. 12/045,220, filed Mar. 10, 2008, Office Action dated Sep. 27, 2011, 20 pages.
U.S. Appl. No. 12/019,335, filed Jan. 24, 2008, Final Office Action dated Dec. 5, 2011, 19 pages.
U.S. Appl. No. 12/019,335, filed Jan. 24, 2008, Advisory Action dated Feb. 27, 2012, 3 pages.
U.S. Appl. No. 12/364,642, filed Feb. 3, 2009, Advisory Action dated Sep. 16, 2011, 3 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Final Office Action dated Aug. 2, 2011, 19 pages.
U.S. Appl. No. 11/357,653, filed Feb. 16, 2006, Advisory Action dated Oct. 12, 2011, 3 pages.
U.S. Appl. No. 12/544,459, filed Aug. 20, 2009, Notice of Allowance dated Aug. 22, 2011, 8 pages.
U.S. Appl. No. 12/544,471, filed Aug. 20, 2009, Office Action dated Jan. 6, 2012, 8 pages.
U.S. Appl. No. 11/949,930, filed Dec. 4, 2007, Office Action dated Sep. 29, 2011, 19 pages.
U.S. Appl. No. 11/949,930, filed Dec. 4, 2007, Notice of Allowance dated Mar. 19, 2012, 19 pages.
U.S. Appl. No. 11/969,343, filed Jan. 4, 2008, Final Office Action dated Oct. 21, 2011, 11 pages.
U.S. Appl. No. 11/969,343, filed Jan. 4, 2008, Advisory Action dated Jan. 5, 2012, 3 pages.
U.S. Appl. No. 12/014,387, filed Jan. 15, 2008, Office Action dated Sep. 7, 2011, 18 pages.
U.S. Appl. No. 12/014,387, filed Jan. 15, 2008, Final Office Action dated Apr. 5, 2012, 17 pages.
U.S. Appl. No. 12/018,718, filed Jan. 23, 2008, Office Action dated Jun. 22, 2011, 23 pages.
U.S. Appl. No. 12/018,718, filed Jan. 23, 2008, Final Office Action dated Feb. 1, 2012, 30 pages.
U.S. Appl. No. 12/019,299, filed Jan. 24, 2008, Final Office Action dated Aug. 25, 2011, 20 pages.
U.S. Appl. No. 12/019,299, filed Jan. 24, 2008, Advisory Action dated Nov. 3, 2011, 2 pages.
U.S. Appl. No. 12/019,299, filed Jan. 24, 2008, Office Action dated Feb. 16, 2012, 18 pages.
U.S. Appl. No. 12/045,220, filed Mar. 10, 2008, Non-Final Office Action dated Oct. 7, 2013, 19 pages.
U.S. Appl. No. 11/357,653, filed Feb. 16, 2006, Non-final Office Action dated Jul. 11, 2013, 26 pages.
U.S. Appl. No. 11/357,653, filed Feb. 16, 2006, Final Office Action dated Nov. 26, 2013, 25 pages.
U.S. Appl. No. 12/014,387, filed Jan. 15, 2008, Notice of Allowance dated Oct. 25, 2013, 17 pages.
U.S. Appl. No. 12/018,718, filed Jan. 23, 2008, Final Office Action dated Sep. 10, 2013, 55 pages.
U.S. Appl. No. 12/018,718, filed Jan. 23, 2008, Advisory Action dated Nov. 15, 2013, 3 pages.

(56) References Cited

OTHER PUBLICATIONS

U.S. Appl. No. 12/791,129, filed Jun. 1, 2010, Non-Final Office Action dated Sep. 11, 2013, 10 pages.
U.S. Appl. No. 12/949,183, filed Nov. 18, 2010, Advisory Action dated Jun. 28, 2013, 3 pages.
U.S. Appl. No. 12/949,183, filed Nov. 18, 2010, Non-Final Office Action dated Sep. 9, 2013, 18 pages.
U.S. Appl. No. 12/949,287, filed Nov. 18, 2010, Non-final Office Action dated Aug. 8, 2013, 24 pages.
U.S. Appl. No. 12/949,287, filed Nov. 18, 2010, Final Office Action dated Nov. 25, 2013, 25 pages.
U.S. Appl. No. 12/957,740, filed Dec. 1, 2010, Non-final Office Action dated Aug. 15, 2013, 17 pages.
U.S. Appl. No. 13/029,219, filed Feb. 17, 2011, Final Office Action dated Oct. 11, 2013, 22 pages.
U.S. Appl. No. 12/957,697, filed Dec. 1, 2010, Non-Final Office Action dated Oct. 1, 2013, 10 pages.
U.S. Appl. No. 10/855,999, filed May 28, 2004, Final Office Action dated Nov. 18, 2013, 14 pages.
U.S. Appl. No. 12/019,335, filed Jan. 24, 2008, Final Office Action dated Jan. 14, 2014, 33 pages.
U.S. Appl. No. 11/969,343, filed Jan. 4, 2008, Notice of Allowance dated Jan. 16, 2014, 6 pages.
U.S. Appl. No. 12/791,129, filed Jun. 1, 2010, Final Office Action dated Dec. 20, 2013, 10 pages.
U.S. Appl. No. 12/949,183, filed Nov. 18, 2010, Final Office Action dated Jan. 21, 2014, 19 pages.
U.S. Appl. No. 13/029,219, filed Feb. 17, 2011, Advisory Action dated Jan. 2, 2014, 3 pages.
U.S. Appl. No. 13/029,226, filed Feb. 17, 2011, Final Office Action dated Jan. 30, 2014, 17 pages.
3rd Generation Partnership Project 2, "Presence Service: Architecture and Functional Description", doc. No. 3GPP2 X.50027-001-0, published on Sep. 2004, 32 pages.
Day, et al., "RFC 2778, A Model for Presence and Instant Messaging", published on Feb. 2000, 12 pages.
U.S. Appl. No. 10/855,999, filed May 28, 2004, Non-Final Office Action dated Mar. 28, 2013, 42 pages.
U.S. Appl. No. 10/855,999, filed May 28, 2004, Advisory Action dated Mar. 18, 2011, 5 pages.
U.S. Appl. No. 11/070,317, filed Mar. 1, 2005, Notice of Allowance dated Oct. 19, 2012, 11 pages.
U.S. Appl. No. 11/939,705, filed Nov. 14, 2007, Final Office Action dated Dec. 5, 2012, 18 pages.
U.S. Appl. No. 12/364,642, filed Feb. 3, 2009, Notice of Allowance dated Nov. 14, 2012, 8 pages.
U.S. Appl. No. 11/357,653, filed Feb. 16, 2006, Advisory Action dated Dec. 4, 2012, 3 pages.
U.S. Appl. No. 12/544,471, filed Aug. 20, 2009, Advisory Action dated Nov. 9, 2012, 3 pages.
U.S. Appl. No. 12/544,471, filed Aug. 20, 2009, Notice of Allowance dated Mar. 12, 2013, 78 pages.
U.S. Appl. No. 12/490,540, filed Jun. 24, 2009, Notice of Allowance dated Feb. 4, 2013, 43 pages.
U.S. Appl. No. 12/019,299, filed Jan. 24, 2008, Advisory Action dated Oct. 29, 2012, 3 pages.
U.S. Appl. No. 12/019,299, filed Jan. 24, 2008, Non Final Office Action dated Dec. 7, 2012, 21 pages.
U.S. Appl. No. 12/948,247, filed Nov. 17, 2010, Final Office Action dated Feb. 11, 2013, 25 pages.
U.S. Appl. No. 12/791,129, filed Jun. 1, 2010, Final Office Action dated Dec. 7, 2012, 9 pages.
U.S. Appl. No. 12/948,450, filed Nov. 17, 2010, Non-Final Office Action dated Nov. 7, 2012, 48 pages.
U.S. Appl. No. 12/949,183, filed Nov. 18, 2010, Non-final Office Action dated Nov. 16, 2012, 69 pages.
U.S. Appl. No. 12/949,287, filed Nov. 18, 2010, Non-final Office Action dated Nov. 19, 2012, 70 pages.
U.S. Appl. No. 12/957,740, filed Dec. 1, 2010, Non-final Office Action dated Oct. 17, 2012, 52 pages.
U.S. Appl. No. 12/957,740, filed Dec. 1, 2010, Final Office Action dated Feb. 15, 2013, 25 pages.
U.S. Appl. No. 13/029,219, filed Feb. 17, 2011, Non-Final Office Action dated Mar. 20, 2013, 65 pages.
U.S. Appl. No. 11/939,705, filed Nov. 14, 2007, Advisory Action dated Jun. 1, 2012, 9 pages.
U.S. Appl. No. 11/939,705, filed Nov. 14, 2007, Office Action dated Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action dated Jun. 15, 2012, 3 pages.
U.S. Appl. No. 12/948,247, filed Nov. 17, 2010, Office Action dated Jul. 6, 2012, 14 pages.
U.S. Appl. No. 12/791,129, filed Jun. 1, 2010, Office Action dated Jul. 10, 2012, 14 pages.
U.S. Appl. No. 13/416,413, filed Mar. 9, 2012, Office Action dated Apr. 27, 2012, 11 pages.
U.S. Appl. No. 11/939,705, filed Nov. 14, 2007, Notice of Allowance dated May 15, 2013, 92 pages.
U.S. Appl. No. 12/018,718, filed Jan. 23, 2008, Non-Final Office Action dated Apr. 24, 2013, 114 pages.
U.S. Appl. No. 12/948,450, filed Nov. 17, 2010, Notice of Allowance dated May 10, 2013, 28 pages.
U.S. Appl. No. 12/949,183, filed Nov. 18, 2010, Final Office Action dated Apr. 17, 2013, 30 pages.
U.S. Appl. No. 12/949,287, filed Nov. 18, 2010, Final Office Action dated Apr. 23, 2013, 28 pages.
U.S. Appl. No. 12/957,740, filed Dec. 1, 2010, Advisory Action dated May 21, 2013, 13 pages.
U.S. Appl. No. 13/029,226, filed Feb. 17, 2011, Non-Final Office Action dated May 28, 2013, 47 pages.
U.S. Appl. No. 11/951,500, filed Dec. 6, 2007, Notice of Allowance dated Jul. 23, 2012, 7 pages.
U.S. Appl. No. 11/070,317, filed Mar. 1, 2005, Notice of Allowance dated Sep. 4, 2012, 8 pages.
U.S. Appl. No. 12/364,642, filed Feb. 3, 2009, Advisory Action dated Sep. 14, 2012, 3 pages.
U.S. Appl. No. 11/357,653, filed Feb. 16, 2006, Final Office Action dated Sep. 21, 2012, 21 pages.
U.S. Appl. No. 12/544,471, filed Aug. 20, 2009, Final Office Action dated Jul. 30, 2012, 26 pages.
U.S. Appl. No. 12/019,299, filed Jan. 24, 2008, Final Office Action dated Aug. 15, 2012, 19 pages.
U.S. Appl. No. 13/416,413, filed Mar. 9, 2012, Notice of Allowance dated Oct. 2, 2012, 5 pages.
U.S. Appl. No. 12/957,697, Non-Final Office Action dated Jul. 2, 2014, 9 pages.
U.S. Appl. No. 11/357,653, Final Office Action dated Aug. 18, 2014, 15 pages.
U.S. Appl. No. 12/018,718, Non-Final Office Action dated Sep. 30, 2014, 50 pages.
U.S. Appl. No. 12/045,220, Notice of Allowance dated Aug. 13, 2014, 5 pages.
U.S. Appl. No. 12/791,129, Corrected Notice of Allowability dated Oct. 6, 2014, 6 pages.
U.S. Appl. No. 12/949,183, Non-Final Office Action dated Sep. 22, 2014, 16 pages.
U.S. Appl. No. 12/949,287, Non-Final Office Action dated Sep. 8, 2014, 27 pages.
U.S. Appl. No. 13/029,219, Final Office Action dated Sep. 12, 2014, 24 pages.
U.S. Appl. No. 12/948,247, Final Office Action dated Nov. 25, 2014, 20 pages.
U.S. Appl. No. 12/957,697, Final Office Action dated Nov. 26, 2014, 11 pages.

(56) References Cited

OTHER PUBLICATIONS

U.S. Appl. No. 13/029,226, filed Feb. 17, 2011, Final Office Action dated Jan. 4, 2016, 14 pages.
U.S. Appl. No. 12/957,740, filed Dec. 1, 2010, Non-Final Office Action dated Jan. 7, 2016, 21 pages.
U.S. Appl. No. 12/018,718, filed Jan. 23, 2008, Non-Final Office Action dated Jan. 6, 2016, all pages.
U.S. Appl. No. 12/957,697, filed Dec. 10, 2010, Final Office Action dated Feb. 3, 2016, all pages.
U.S. Appl. No. 12/949,183, filed Nov. 18, 2010, Final Office Action dated Feb. 8, 2016, all pages.
U.S. Appl. No. 11/123,468, filed May 5, 2005, Final Office Action dated Apr. 8, 2016, all pages.
U.S. Appl. No. 12/949,287, filed Nov. 18, 2010, Final Office Action dated Feb. 19, 2016, all pages.
U.S. Appl. No. 11/123,468, Non-Final Office Action dated Jan. 30, 2015, 19 pages.
U.S. Appl. No. 12/949,183, Final Office Action dated Jan. 22, 2015, 16 pages.
U.S. Appl. No. 12/949,287, Final Office Action dated Dec. 23, 2014, 27 pages.
U.S. Appl. No. 12/957,697, Advisory Action dated Feb. 3, 2015, 3 pages.
U.S. Appl. No. 13/029,219, Notice of Allowance dated Jan. 22, 2015, 12 pages.
U.S. Appl. No. 13/029,226, Final Office Action dated Jan. 8, 2015, 13 pages.
U.S. Appl. No. 12/948,247, Advisory Action dated Mar. 6, 2015, 3 pages.
U.S. Appl. No. 12/949,183, Advisory Action dated Mar. 26, 2015, 3 pages.
U.S. Appl. No. 12/949,287, Advisory Action dated Mar. 10, 2015, 3 pages.
U.S. Appl. No. 12/957,697, Non-Final Office Action dated Mar. 6, 2015, 11 pages.
U.S. Appl. No. 12/957,740, Non-Final Office Action dated Feb. 13, 2015, 17 pages.
U.S. Appl. No. 13/029,226, Advisory Action dated Mar. 25, 2015, 2 pages.
U.S. Appl. No. 10/855,999, Non-Final Office Action dated Jun. 17, 2015, 16 pages.
U.S. Appl. No. 12/018,718, Final Office Action dated Jun. 30, 2015, 22 pages.
U.S. Appl. No. 12/957,697, Final Office Action dated Jun. 18, 2015, 12 pages.
U.S. Appl. No. 13/029,226, Non-Final Office Action dated Jun. 19, 2015, 13 pages.
U.S. Appl. No. 11/357,653, Notice of Allowance dated Oct. 5, 2015, 16 pages.
U.S. Appl. No. 11/357,653, Notice of Allowance dated Sep. 11, 2015, 19 pages.
U.S. Appl. No. 12/948,247, Notice of Allowance dated Oct. 13, 2015, 8 pages.
U.S. Appl. No. 12/949,183, Non-Final Office Action dated Sep. 16, 2015, 15 pages.
U.S. Appl. No. 12/949,287, Non-Final Office Action dated Sep. 18, 2015, 29 pages.
U.S. Appl. No. 12/957,697, Advisory Action dated Aug. 25, 2015, 2 pages.
U.S. Appl. No. 12/957,697, Non-Final Office Action dated Oct. 15, 2015, 13 pages.
U.S. Appl. No. 12/957,740, Final Office Action dated Aug. 12, 2015, 18 pages.
U.S. Appl. No. 11/357,653, Non Final Office Action dated Mar. 27, 2014, 19 pages.
U.S. Appl. No. 11/969,343, Notice of Allowance dated Apr. 9, 2014, 6 pages.
U.S. Appl. No. 12/014,387, Corrective Notice of Allowance dated Dec. 18, 2013, 4 pages.
U.S. Appl. No. 12/019,299, Notice of Allowance dated Jul. 3, 2013, 6 pages.
U.S. Appl. No. 12/019,335, Non Final Office Action dated Jul. 26, 2013, 19 pages.
U.S. Appl. No. 12/045,220, Final Office Action dated Apr. 18, 2014, 20 pages.
U.S. Appl. No. 12/791,129, Advisory Action dated Mar. 6, 2014, 3 pages.
U.S. Appl. No. 12/791,129, Notice of Allowance dated Apr. 24, 2014, 9 pages.
U.S. Appl. No. 12/949,183, Advisory Action dated Apr. 10, 2014, 3 pages.
U.S. Appl. No. 12/957,697, Non-Final Office Action dated Mar. 20, 2014, 12 pages.
U.S. Appl. No. 12/957,740, Final Office Action dated Feb. 19, 2014, 18 pages.
U.S. Appl. No. 13/029,219, Non Final Office Action dated Apr. 11, 2014, 23 pages.
U.S. Appl. No. 13/029,226, Advisory Action dated Apr. 7, 2014, 3 pages.
Maffioletti et al., Automatic resource and service management for ubiquitous computing environments, Pervasive Computing and Communications Workshops, Proceedings of the Second IEEE Annual Conference on IEEE, 2004.
Simon et al., A simple query interface for interoperable learning repositories, Proceedings of the 1st Workshop on Interoperability of Web-based Educational Systems, 2005, pp. 11-18.
U.S. Appl. No. 11/123,468, Non-Final Office Action dated Jun. 10, 2014, 18 pages.
U.S. Appl. No. 12/019,335, Notice of Allowance dated Jun. 11, 2014, 7 pages.
U.S. Appl. No. 12/948,247, Non-Final Office Action dated May 21, 2014, 18 pages.
U.S. Appl. No. 12/957,697, Advisory Action dated May 29, 2014, 2 pages.
U.S. Appl. No. 12/957,740, Advisory Action dated May 23, 2014, 3 pages.
U.S. Appl. No. 13/029,226, Non-Final Office Action dated May 22, 2014, 12 pages.
U.S. Appl. No. 12/018,718 , "Final Office Action", dated Aug. 25, 2016, 29 pages.
U.S. Appl. No. 12/957,697, Notice of Allowance dated Jun. 15, 2016, 8 pages.
U.S. Appl. No. 12/957,740, Notice of Allowance dated Jul. 29, 2016, 7 pages.
U.S. Appl. No. 10/855,999, Final Office Action dated Nov. 9, 2016, 19 pages.

\* cited by examiner

CHARGING ENABLER

CROSS-REFERENCES TO RELATED APPLICATIONS

This application claims the benefit of U.S. Provisional Application No. 61/090,648, filed Aug. 21, 2008 by Maes and entitled "In-Vehicle Multimedia Real-Time Communications," of which the entire disclosure is incorporated herein by reference for all purposes.

This application is also related to the following commonly-owned, applications (the "Related Applications"), of which the entire disclosure of each is incorporated herein by reference for all purposes:

U.S. patent application Ser. No. 10/855,999, filed May 28, 2004 by Maes and entitled "Method and Apparatus for Supporting Service Enablers Via Service Request Handholding"; U.S. patent application Ser. No. 11/130,636, filed May 16, 2005, by Maes and entitled "Methods and Systems for Exposing Access Network Capabilities Using an Enabler Proxy"; U.S. patent application Ser. No. 11/070,317, filed Mar. 1, 2005, by Maes and entitled "Policy Interface Description Framework"; U.S. patent application Ser. No. 11/357,653, filed Feb. 16, 2006, by Maes and entitled "Factorization of Concerns to Build a SDP (Service Delivery Platform)"; U.S. patent application Ser. No. 12/019,335, filed Jan. 24, 2008, by Maes and entitled "Integrating Operational and Business Support Systems with a Service Delivery Platform"; and U.S. patent application Ser. No. 12/948,247, filed Nov. 17, 2010, by Maes and entitled "Methods and Systems for Generating Metadata Describing Dependencies for Composable Elements".

BACKGROUND OF THE INVENTION

Embodiments of the present invention relate generally to methods and systems for charging for services such as communication services and more particularly to a charging enabler for abstracting charging functions of a charging or billing system.

Various methods and systems have been established for billing and/or charging for services such as communication services. For example, various Operations Support Systems (OSS) and/or Business Support Systems (BSS) systems or components can provide for rating, charging, billing, etc. for services provided on or through a network including communication services, media exchange services, download services, etc. Generally speaking, these systems can receive or detect events on a network from one or more network elements, i.e., in the form of a Charging Data Record (CDR) and performing rating and charging functions related to the received CDR. Other functions these systems may perform can include various account management and payment processing functions.

However, these existing billing systems present certain limitations. For example, current billing or charging systems are limited to particular in network protocols through which applications and/or services are expected to interact with the system. These however are designed for core services developed in network and not well designed for usage by a service layer application. Furthermore, these systems limit an application's or service's ability to influence or control the charging and/or billing functions. That is, these systems provide certain defined functions but and restrict the application or service to use of those functions to any extent they may be provided to the applications or services through their interfaces. So for example, an application or service would have limited or no ability to control or manage rating for particular services without some complicated hack or pre-configuration of the service or a context for the traffic. Hence, there is a need for improved methods and systems for providing charging functions.

BRIEF SUMMARY OF THE INVENTION

Embodiments of the invention provide systems and methods for providing charging functions. According to one embodiment, a method of charging for services on a communication network can comprise receiving a request to perform a charging function (including, for example, access to/access of balance of account) from an application via a northbound interface of a charging enabler. The northbound interface can provide an abstract interface for invoking one or more of a plurality of charging functions. In some cases, the northbound interface of the charging enabler can comprise an Application Program Interface (API). For example, the northbound interface can comprise a Simple Object Access Protocol (SOAP) API, a REpresentational State Transfer (REST) API, a Java API, or other interface. The one or more charging functions can comprise charging for the services provided on the communications network, one or more account management functions, one or more payment processing functions, one or more rating functions, and/or other functions.

The charging function can be requested from a network resource via a southbound interface of the charging enabler. For example, the network resource can comprise a billing system. The southbound interface can provide an interface specific to the network resource. For example, the southbound interface can comprise a Diameter interface, a Session Initiation Protocol (SIP) interface (e.g. if CDRs are generated as SIP notifications to the charging enabler), a Parlay interface, an Intelligent Network (IN) protocol interface, or other interface to an underlying protocol. Results of the charging function can be received from the network resource via the southbound interface of the charging enabler and returned to the application via the northbound interface of the charging enabler.

According to another embodiment, a charging enabler can comprise an abstraction layer including one or more northbound interfaces providing an abstract interface for providing notification of network events and invoking one or more of a plurality of charging functions of a first network resource such as a billing system. In some cases, the northbound interface of the charging enabler can comprise an Application Program Interface (API). For example, the northbound interface can comprise a Simple Object Access Protocol (SOAP) API, a REpresentational State Transfer (REST) API, a Java API, or other interface. The one or more charging functions can comprise charging for the services provided on the communications network, one or more account management functions, one or more payment processing functions, one or more rating functions, and/or other functions.

The charging enabler can also comprise one or more enabler instances. Each of the one or more enabler instances can provide a southbound interface providing an interface specific to the first network resource. For example, the southbound interface can comprise a Diameter interface on a Session Initiation Protocol (SIP) network, a Parlay interface, an Intelligent Network (IN) interface, or other interface. In use, the charging enabler can be adapted to receive a request to perform a charging function of the first network resource from an application via the northbound interface and request the charging function of the first network resource via the southbound interface. In such cases, the charging enabler can be further adapted to receive results of the charging function from the first network resource via the southbound interface of the charging enabler and return the results of the charging function to the application via the northbound interface of the charging enabler. Additionally or alternatively, the charging enabler can be further adapted to receive an event notification from a second network resource via the southbound interface of the charging enabler and notify the application of the notification via the northbound interface of the charging enabler. In such cases, the application can be adapted to determine one or more charging functions to be performed in response to the notification and request the one or more charging functions via the northbound interface of the charging enabler. The charging enabler can then receive the request to perform the one or more charging functions from the application via the northbound interface of the charging enabler and request the charging function from the first network resource via the southbound interface of the charging enabler.

According to yet another embodiment, a system can comprise a communication network and a first network resource, such as a billing system, communicatively coupled with the communication network. The first network resource can provide a plurality of charging functions. An application can be communicatively coupled with the communications network and can provide one or more services via the communications network. The system can also include a charging enabler communicatively coupled with the communication network and the application. The charging enabler can comprise an abstraction layer including one or more northbound interfaces. The northbound interface can provide an abstract interface for providing notification of network events and invoking one or more of the plurality of charging functions of the first network resource. The enabler can also include one or more enabler instances. Each of the one or more enabler instances can include a southbound interface providing an interface specific to the first network resource.

The charging enabler can be adapted to receive a request to perform a charging function of the plurality of charging functions of the first network resource from the application via the northbound interface and request the charging function of the first network resource via the southbound interface. The charging enabler can be further adapted to receive results of the charging function from the first network resource via the southbound interface of the charging enabler and return the results of the charging function to the application via the northbound interface of the charging enabler.

In some cases, the system can further comprise a second network resource communicatively coupled with the communications network. In such cases, the charging enabler can be adapted to receive an event notification from the second network resource via the southbound interface of the charging enabler and notify the application of the notification via the northbound interface of the charging enabler. The application can determine one or more charging functions to be performed in response to the notification and request one of the plurality of charging functions via the northbound interface of the charging enabler. The charging enabler can receive the request to perform the one or more charging functions from the application via the northbound interface of the charging enabler and request the charging function from the first network resource via the southbound interface of the charging enabler.

DETAILED DESCRIPTION OF THE INVENTION

Figure 1:
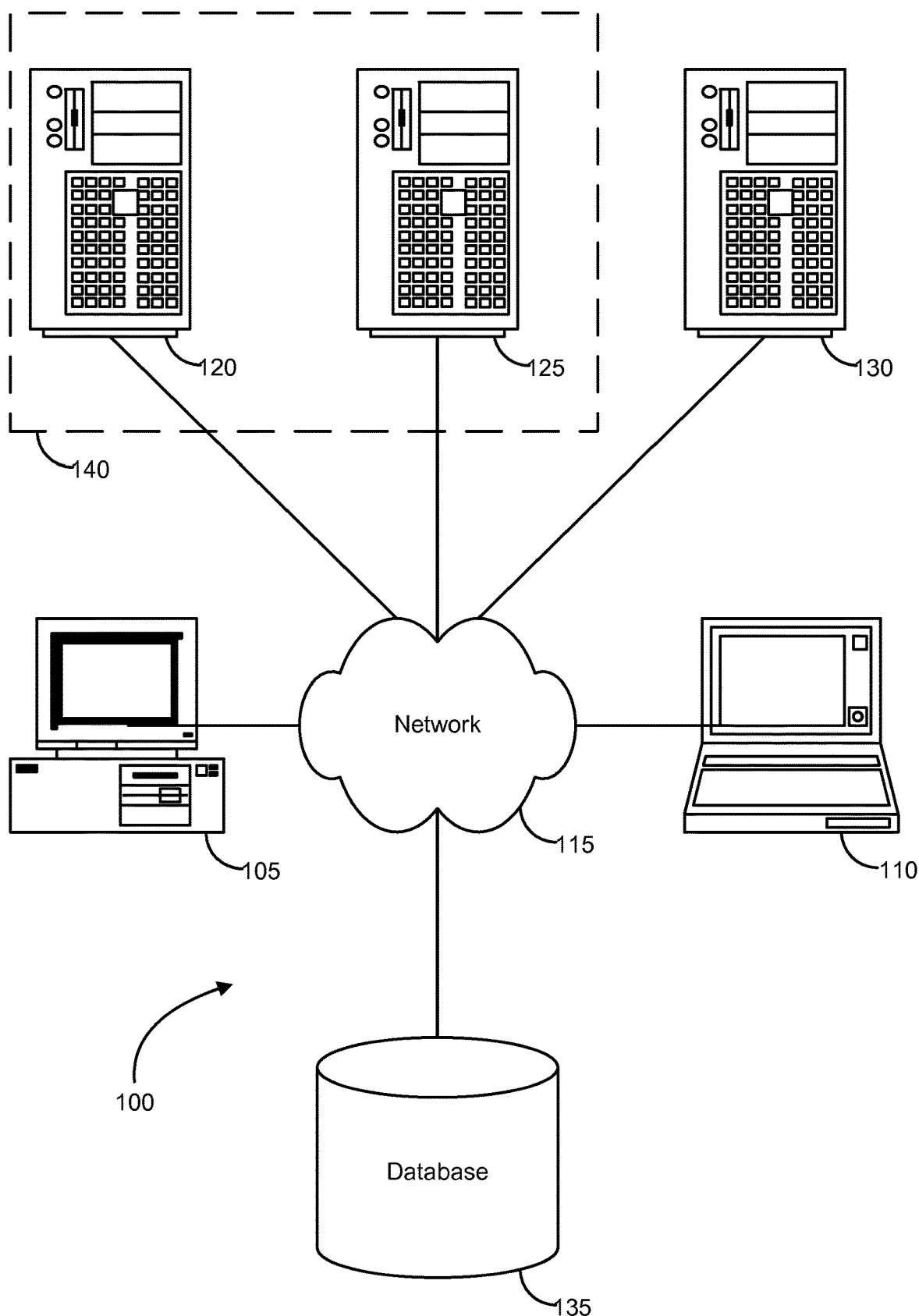
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide a charging enabler for abstracting charging functions of a charging or billing system. More specifically, embodiments of the present invention provide for abstracting the functionality of a billing system such as an OSS or BSS component that exposes the capability to handle requests for charges (e.g., in real time, offline or online) to create charging events in the billing system, to query the status of a current bill or queue of events in the billing system, to manage an account, e.g., adding money, processing payments, etc., and/or other charging or billing functions. The charging enabler can provide this abstraction independent of the technology of the billing system with adapters to the specific billing system, e.g., with specific protocols, interface calls, etc. Through this abstract interface, applications and/or services can generate charges in the billing system for particular services or activities. Generating such charge may include rating the service or activity. For example, rating may be requested or assigned by the application of may be delegated to the billing system by the application.

Stated another way, charging for services on a communication network can comprise receiving a request to perform a charging function from an application via a northbound interface of a charging enabler. The northbound interface can provide an abstract interface for invoking one or more of a plurality of charging functions. In some cases, the northbound interface of the charging enabler can comprise an Application Program Interface (API). For example, the northbound interface can comprise a Simple Object Access Protocol (SOAP) API, a REpresentational State Transfer (REST) API, a Java API, or other interface. The one or more charging functions can comprise charging for the services provided on the communications network, one or more account management functions, one or more payment processing functions, one or more rating functions, and/or other functions.

The charging function can be requested from a network resource, such as a billing system, via a southbound interface of the charging enabler. The southbound interface can provide an interface specific to the network resource. For example, the southbound interface can comprise a Diameter interface on a Session Initiation Protocol (SIP) network, a Parlay interface, an Intelligent Network (IN) interface, or other interface. Results of the charging function can be received from the network resource via the southbound interface of the charging enabler and returned to the application via the northbound interface of the charging enabler. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server (s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
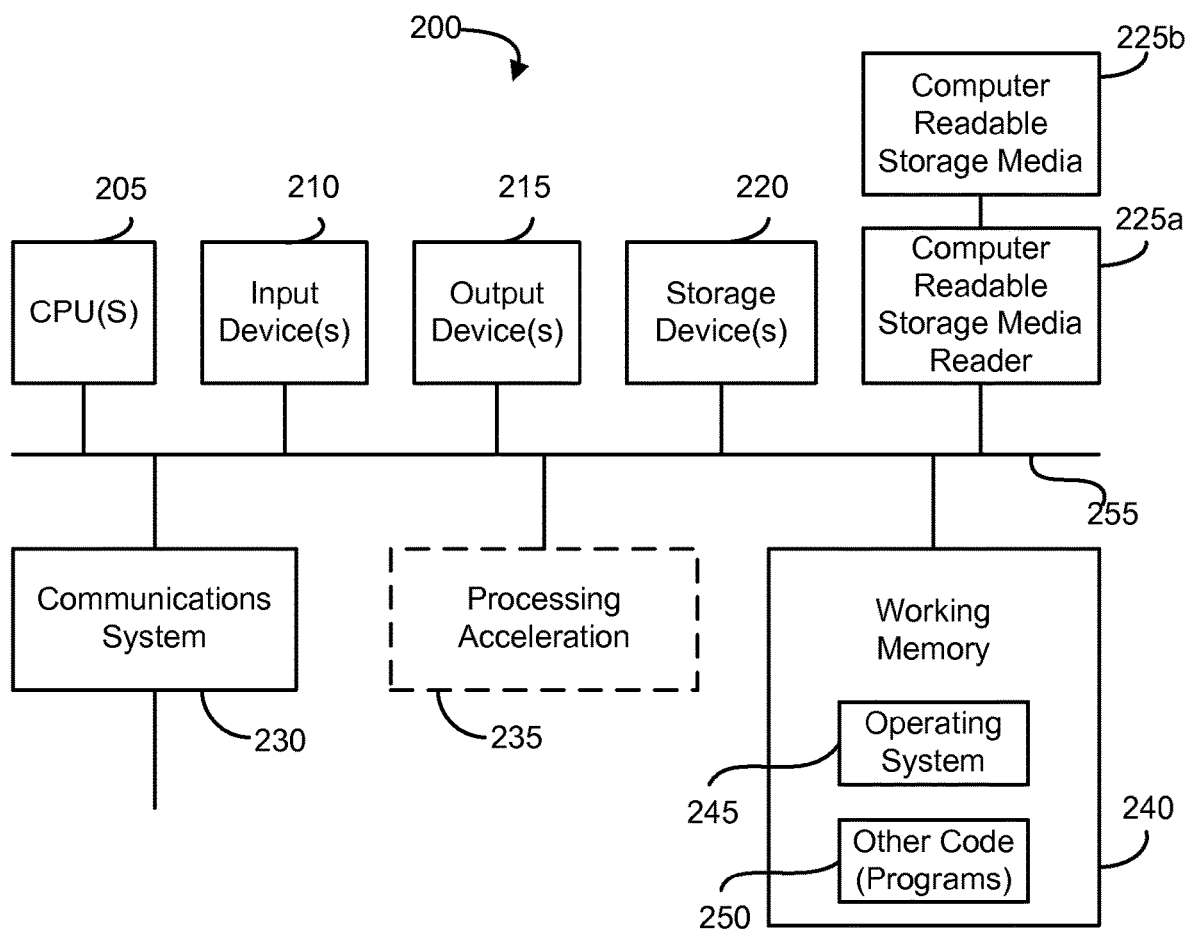
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
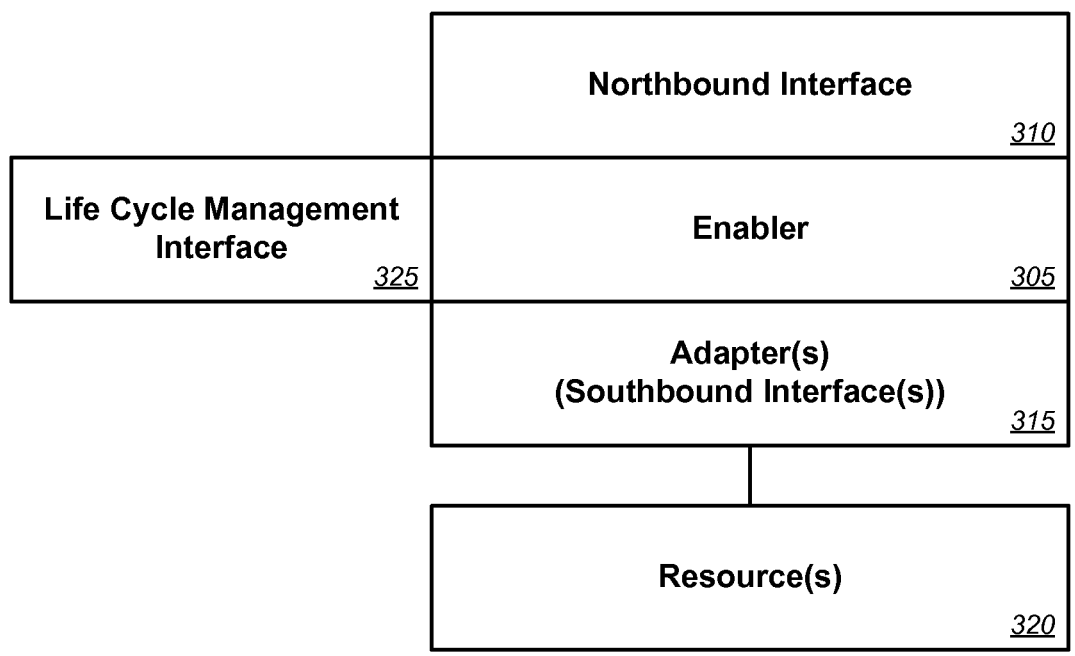
FIG. 3 is a block diagram illustrating functional components of an enabler for abstracting resources according to one embodiment of the present invention.

FIG. 3 is a block diagram illustrating, at a high-level, functional components of an enabler according to one embodiment of the present invention. Details of various embodiments and uses of such an enabler are described in detail in the Related Applications cited above. For example, see the Related Application entitled "Factorization of Concerns to Build a SDP (Service Delivery Platform)". However, it should be understood that embodiments of the present invention are not limited to implementation in a SDP or other particular type of platform. Rather, a charging enabler as described herein can be implemented in a variety of other systems and/or environments. As used herein, the term enabler refers to a reusable service layer component or components that provide a function (preferably intrinsic) for use by others (other enablers, applications (i.e. services) or any authorized resource) through appropriate northbound interfaces. A southbound interface need not be specified as part of the adapter, so it can be changed from resource instance to resource instance (e.g. if they require different interfaces/protocols to interact with them). However, northbound interfaces provided by an enabler may be standardized.

As described in the Related Applications, different resources, technologies, combination of resources, etc. utilize different adapters. In general, an enabler 305 provides abstract/logical functions and may rely on one or multiple resources 320 to perform these functions via one or more adapters (south bound interfaces) 315 specific to the resource(s). The enabler 305 also provides a northbound interface 310 to expose function(s) logically and/or abstractly and can be realized in any protocol/API/technology binding, e.g. Java, WS (SOAP or REST), SIP, etc. The enabler 305 can also provide a life cycle management interface 325 to expose/provide management of the enabler 305 and its dependencies (i.e. resources 320 that the enabler implementation manages through the adapter 315) to affect: creation; installation and deployment; instantiation; configuration; assurance, monitoring and auditing/reporting (including for charging/billing purposes); update; retirement; etc.

Figure 4:
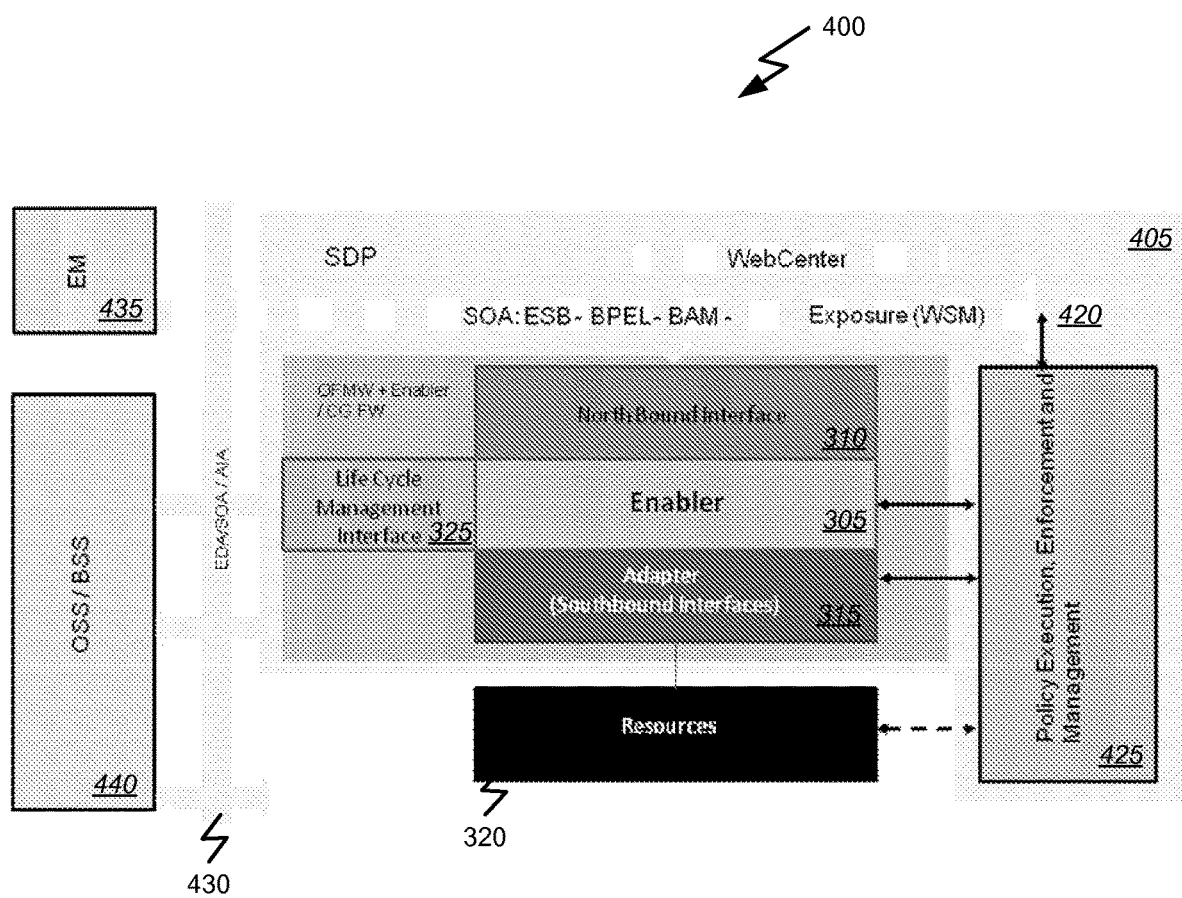
FIG. 4 is a block diagram illustrating a system including an enabler for abstracting resources according to one embodiment of the present invention.

FIG. 4 is a block diagram illustrating a system including an enabler for abstracting resources according to one embodiment of the present invention. In this example, the system 400 includes a enabler 305 as introduced above. The enabler 305 can include a northbound interface 310 that abstracts one or more functions of resources 320 as described above and provide access to the abstracted one or more functions. The enabler 305 can also include one or more adapters 315 or southbound interfaces. The adapters 315 can, for example, communicate in the protocol supported by the resources 320, e.g., SIP, HTTP, Diameter, or other Intelligent Networking (IN) protocol including but not limited to Transaction Capabilities Application Part (TCAP), Internet Message Access Protocol (IMAP), Customized Applications for Mobile Enhanced Logic (CAMEL), etc.

As noted, the enabler 305 can abstract or hide the underlying technologies from the resources 350. That is, the enabler 305 can communicate and/or interact with the resources 320 in a protocol appropriate to those resources 320 via the adapters 315 or southbound interfaces and provide access to those resources 320 in a manner abstracted from the underlying protocols or technologies of those resources 320 via the northbound interface 310. Actions of the enabler 305 can be controlled or affected by a life cycle management interface 325 and/or one or more policies applied by policy execution, enforcement, and management module 435.

According to one embodiment, the enabler 300 can be implemented as part of a Service Delivery Platform (SDP) 405 such as described, for example, in the Related Application entitled "Factorization of Concerns to Build a SDP (Service Delivery Platform)" referenced above. As noted therein, the SDP 405 can include an Enterprise Service Bus (ESB) 420. In such cases, the enabler 305 can be adapted to communicate with or through the ESB 420 via the northbound interfaces 305 of the enabler 300. That is, the enabler 305 can be adapted to place abstracted notifications or other information from the resources 320 or events thereof on the ESB 420 via the northbound interface 305. Additionally or alternatively, the northbound interface 305 of the enabler 300 can receive instructions and/or other information from other elements of the system 400 from the ESB 420.

For example, ESB 420 coupled with/implemented as part of Event Driven Architecture (EDA) 430 as described, for example, in U.S. patent application Ser. No. 12/045,220 filed Mar. 10, 2008 by Maes and entitled "Presence-Based Event Driven Architecture" the entire disclosure of which is incorporated herein by reference for all purposes. As noted therein the EDA can also include or be coupled with an event monitor 435 and/or other application as well as 686 and Operation Support Systems/Business Support Systems (OSS/BSS) 440. In use, events or information from the resources 320 can come in from the adapters 335 and be placed on the bus/ESB 420 by the northbound interface 305 of the enabler 300). The events can then be distributed to a target listener (e.g., the event monitor 435 or other registered application(s) if any). In between the events may be managed, for example based on policies enforced by policy execution, enforcement, and management module 425 to order the events with a strategy, e.g., a concurrency strategy, that decides when multiple events are to be processed, who and when they are put on the bus 420, how the bus 420 processes them and how the listeners process them etc.

Figure 5:
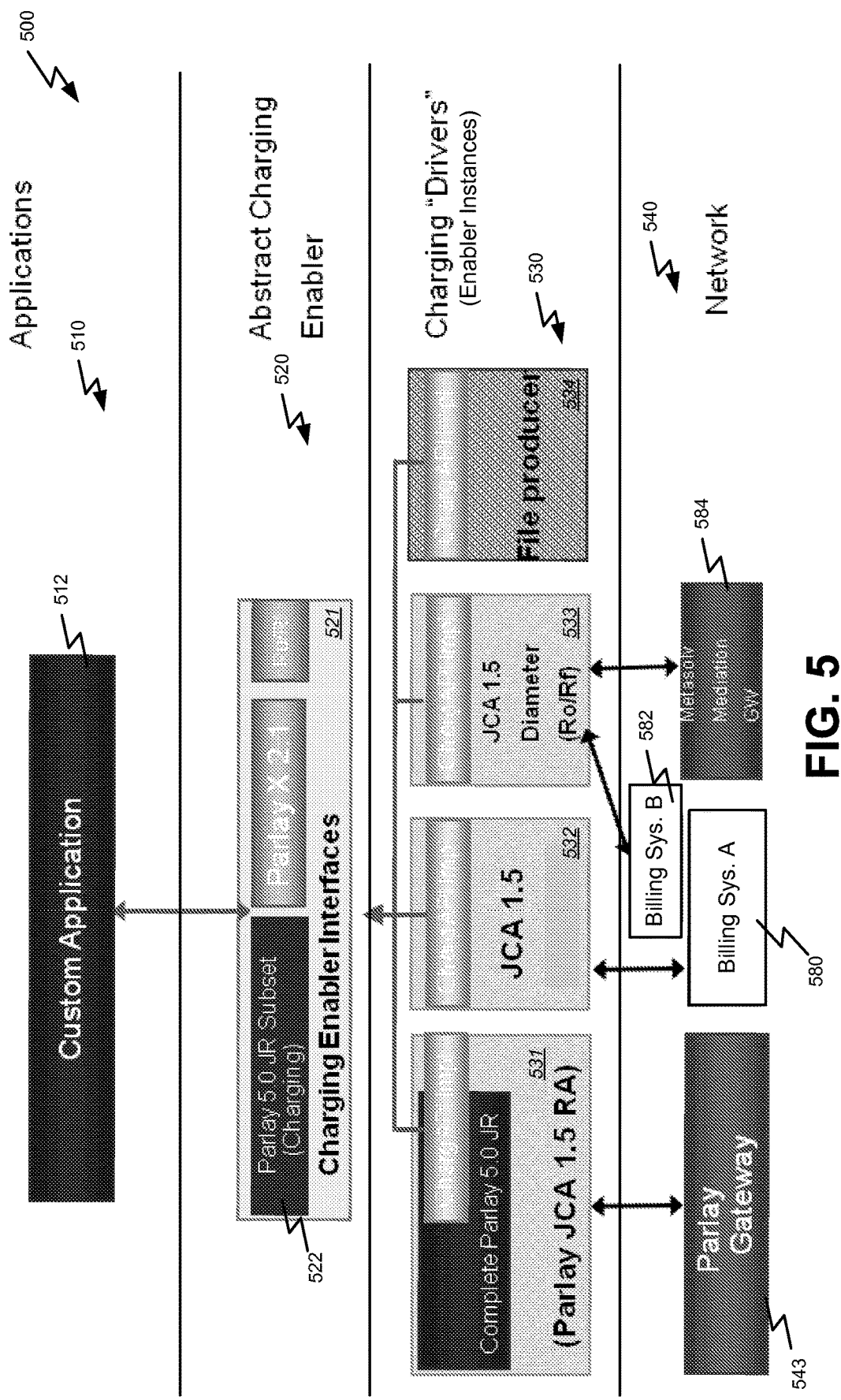
FIG. 5 is a block diagram illustrating details of a charging enabler according to one embodiment of the present invention.

FIG. 5 is a block diagram illustrating details of a charging enabler according to one embodiment of the present invention. In this example, the implementation of the charging enabler 500 is divided into a number of logical layers including, but not limited to, a layer of applications 510, a layer comprising one or more abstract charging enablers 520, a layer comprising specific charging enabler instances 530 or drivers, and a network layer 540. Generally speaking, the application layer 510 can comprise any of a number of specific applications that may interface and/or interact with the charging enablers 520 and 530. For example, the applications can include, but are not limited to, a java application, a web service 513, a Virtual Public Branch eXchange (VPBX), a VoIP residential, a PBX or intranet VoIP application, a conference application, a Voice mail or unified messaging application, a VCC (Voice Continuity) applications and/or any number of other applications.

The abstract charging enabler layer 520 can include, but is not limited to, any of a number of interfaces 521 which, according to one embodiment, can provide high-level Application Program Interfaces (APIs) 522. Via the APIs 522, applications 510 can call or invoke various functions or features of the charging enabler. For example, the APIs 522 provided by the abstract charging enabler layer 520 can include, but is not limited to, a Parlay 5.0 JR Subset API, a Parlay X API, a Ro/Rf API, a Simple Object Access Protocol (SOAP) API, a REpresentational State Transfer (REST) API, a Java API, or other interface. The one or more charging functions invokable or accessible through these API(s) can comprise charging for the services provided on the communications network, one or more account management functions, one or more payment processing functions, one or more rating functions, and/or other functions. Upon invocation by an application 510 via the API 522, one or more instances of the charging enabler may be instantiated. That is, one or more charging enabler instances 530 can be created for specific charging enabler implementations based on the request from the applications 510 via the API 522.

The individual charging enabler instances 530 can be implemented in many ways to perform various functions and provide adapters to resources of the network 540. For example, the charging enabler instances 530 can include a instances 531 for interfacing or adapting to Parlay based resources. Such instances can provide, for example, Java J2EE Connector Architecture (JCA1.5) adapters to a Parlay gateway (GW) 543 JCA adapters to IN GW or PBX, and/or JCA adapter 533 to another resource. Other instances 534 can include adapters comprising a file producer and/or instances 532 and 533 comprising JCA and Diameter adapters to network resources such as a billing system 580, a second billing system 582, a mediation gateway 584, etc.

The charging enabler 500 can be adapted to receive a request to perform a charging function of the first network resource such as billing system(s) 580 and/or 582 from the application 512 via the northbound interface 522 and request the charging function of the first network resource via the appropriate southbound interface or adapter 531-534. In some cases, the charging enabler 500 can be further adapted to receive results of the charging function from the first network resource via the southbound interface or adapter 531-534 and return the results of the charging function to the application 512 via the northbound interface 522. Additionally or alternatively, the charging enabler 500 can be adapted to receive a notification of an event from a resource of the network 540, e.g., an initiation of a call detected by gateway 543, through an adapter of the enabler instances 531-534. The charging enabler can provide this notification to an application 512 via an abstract northbound interface 521. The application 512 may in turn determine and request one or more charging functions of another network resource, e.g., billing system 580, via the northbound interface 522 of the charging enabler 500.

Stated another way a charging enabler 500 can comprise an abstraction layer 520 including one or more northbound interfaces 522 providing an abstract interface for providing notification of network events and invoking one or more of a plurality of charging functions of a first network resource, e.g., billing system 580, billing system 582, etc. In some cases, the northbound interface 522 of the charging enabler 500 can comprise an Application Program Interface (API). For example, the northbound interface can comprise a Simple Object Access Protocol (SOAP) API, a REpresentational State Transfer (REST) API, a Java API, or other interface. The one or more charging functions can comprise charging for the services provided on the communications network, one or more account management functions, one or more payment processing functions, one or more rating functions, and/or other functions.

The charging enabler 500 can also comprise one or more enabler instances 530. Each of the one or more enabler instances 530 can provide a southbound interface 532 or adapter providing an interface specific to the first network resource 580. For example, the southbound interface 532 can comprise a Session Initiation Protocol (SIP) interface, a Parlay interface, an Intelligent Network (IN) interface, or other interface. In use, the charging enabler 500 can be adapted to receive a request to perform a charging function of the first network resource 580 from an application 512 via the northbound interface 522 and request the charging function of the first network resource 580 via the southbound interface 532. In such cases, the charging enabler 500 can be further adapted to receive results of the charging function from the first network resource 580 via the southbound interface 532 of the charging enabler 500 and return the results of the charging function to the application 512 via the northbound interface 522 of the charging enabler 500. Additionally or alternatively, the charging enabler 500 can be further adapted to receive an event notification from a second network resource, e.g., gateway 543 via the southbound interface 531 of the charging enabler 500 and notify the application 512 of the notification via the northbound interface 522 of the charging enabler. In such cases, the application 522 can be adapted to determine one or more charging functions to be performed in response to the notification and request the one or more charging functions via the northbound interface 522 of the charging enabler 500. The charging enabler 500 can then receive the request to perform the one or more charging functions from the application 512 via the northbound interface 522 of the charging enabler 500 and request the charging function from the first network resource 580 via the southbound interface 532 of the charging enabler 500.

Figure 6:
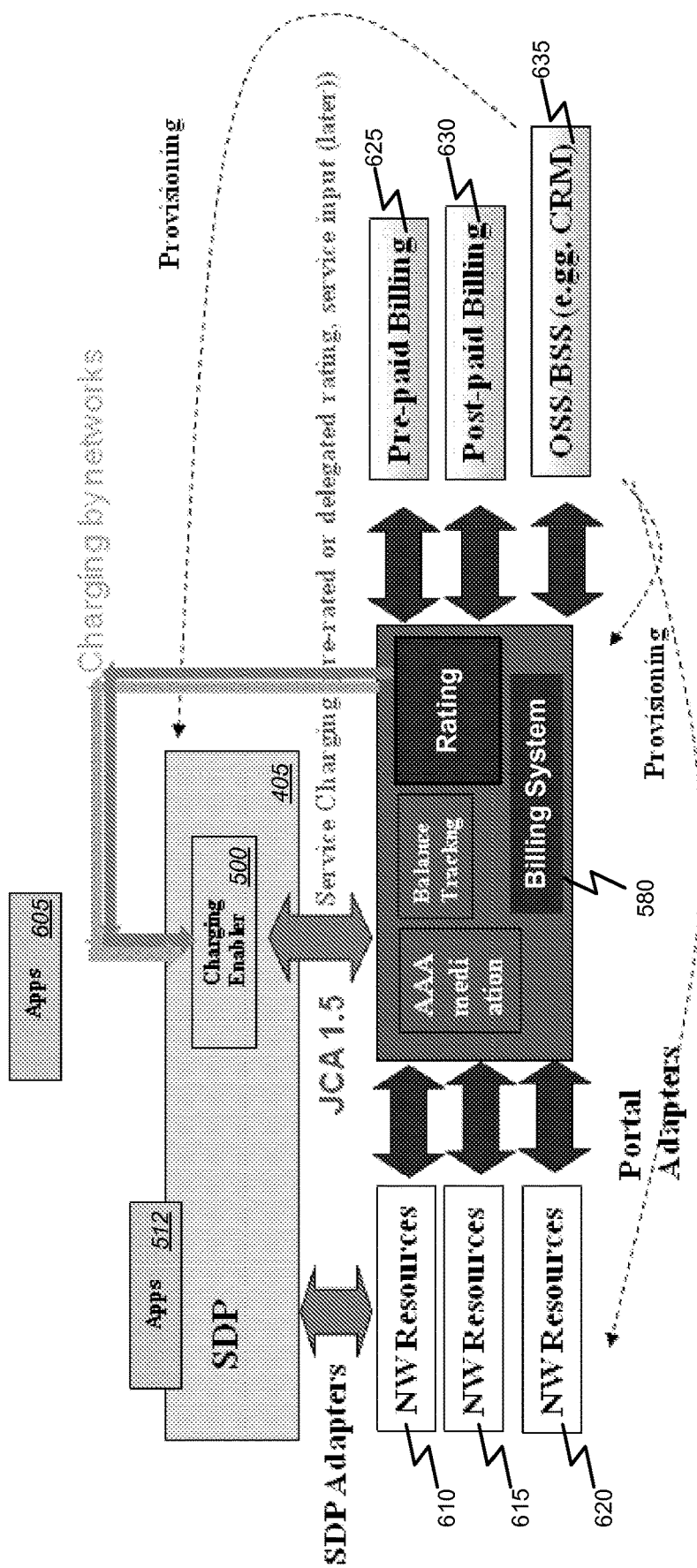
FIG. 6 is a block diagram illustrating a system in which a charging enabler can be implemented according to one embodiment of the present invention.

FIG. 6 is a block diagram illustrating a system in which a charging enabler can be implemented according to one embodiment of the present invention. In this example, the system 600 includes an SDP 405 as described above with reference to FIG. 4. As noted above, the SDP 405 can include a charging enabler 500 as described herein. One or more applications 512 and 605 can provide any of a variety of services on or through the SDP 405. The system can also include any of a variety of network resources 610-620 including a billing system 580 as described above and providing charging functions such as mediation, balance tracking, rating, etc. Other resource can provide additional charging functions including but not limited to resources providing pre-paid billing 625, resources providing post-paid billing, an OSS/BSS 635, etc. Each of the various elements of the system 600 can be coupled with one or more communications networks (not shown here) such as any local or wide area, wired or wireless network as described above.

As described herein, embodiments of the present invention provide for abstracting the functionality of a billing system such as billing system 580, OSS/BSS system 635, or other components that expose the capability to handle requests for charges (e.g., in real time, offline or online) to create charging events in the billing system, to query the status of a current bill or queue of events in the billing system, to manage an account, e.g., adding money, processing payments, etc., and/or other charging or billing functions. The charging enabler 500 can provide this abstraction independent of the technology of the billing system with adapters to the specific billing system, e.g., with specific protocols, interface calls, etc. as described above. Through this abstract interface, applications 512 and 605 and/or services can generate charges in the billing system for particular services or activities.

Figure 7:
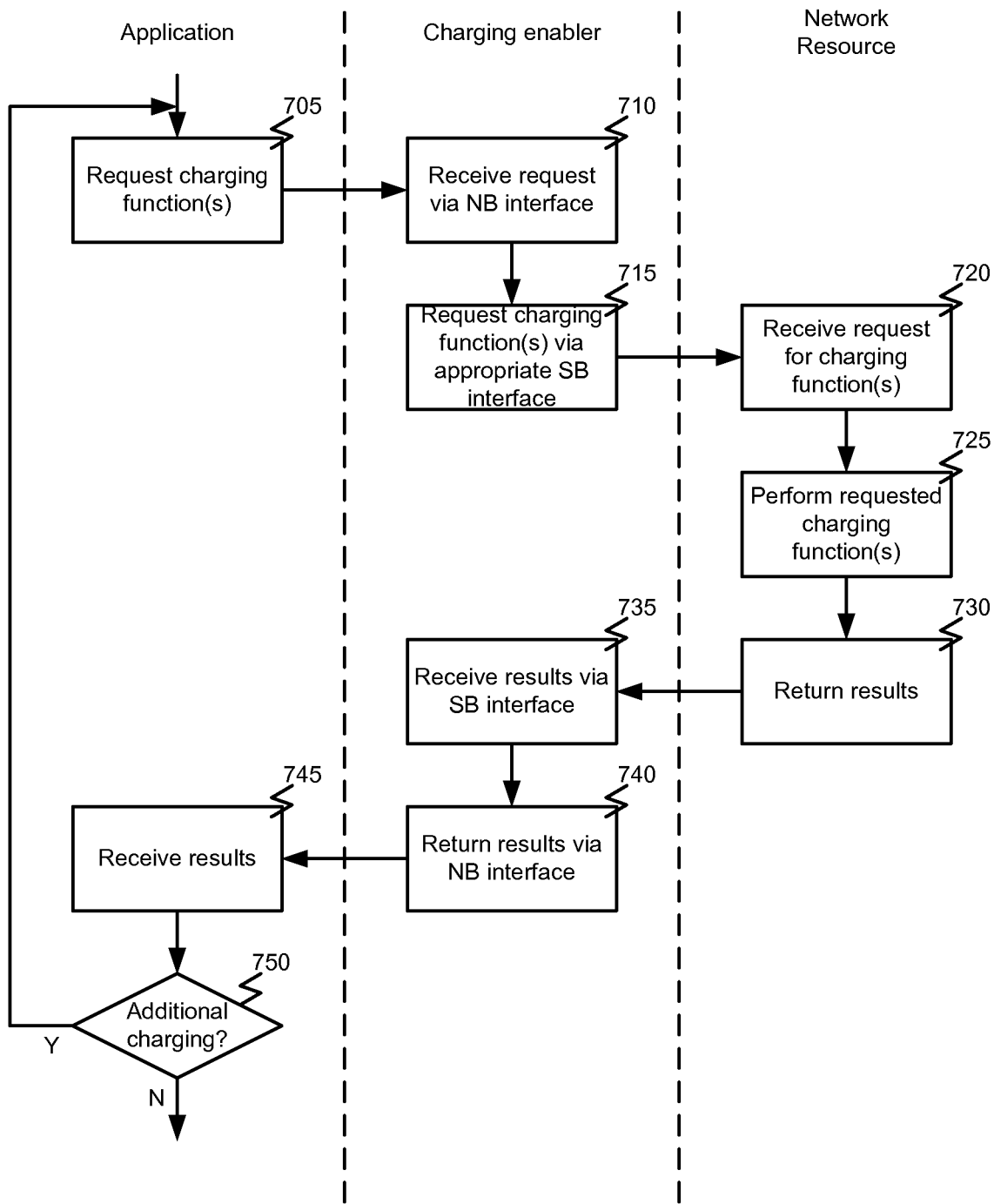
FIG. 7 is a flowchart illustrating a process for performing charging according to one embodiment of the present invention.

FIG. 7 is a flowchart illustrating a process for performing charging according to one embodiment of the present invention. In this example, processing begins with the application requesting 705 one or more charging functions via the abstract northbound interface of the charging enabler. The charging enabler receives 710 the request to perform a charging function from the application via the northbound interface of the charging enabler. As noted above, the request can comprise, for example a request to charge for the services provided on the communications network, manage one or more accounts, process one or more payments, perform one or more rating functions, and/or other functions, etc. The charging function can in turn be requested 715 by the charging enabler from a network resource via a southbound interface of the charging enabler.

The network resource, typically the billing system, can receive 720 the request from the charging enabler and perform 725 the requested charging function. Performing 725 the charging functions can include the network resource generating results of the function, collecting information from the user, or detecting events. Therefore, the network resource can return 730 such results or events to the charging enabler via the southbound interfaces of the charging enabler.

The charging enabler can receive 7535 the results of the charging function from the network resource via the southbound interface of the charging enabler and return 740 the results of the charging function to the application via the northbound interface of the charging enabler. The application can in turn receive 745 the results from the charging enabler via the northbound interface of the charging enabler and determine 750 whether to perform additional charging functions. If a determination 750 is made to perform addition charging functions, the application can again request 705 the charging functions via the northbound interface of the charging enabler. The charging functions can include any of a wide variety of possible functions, including but not limited to, charging an account a given amount (price), charging an account a unit of something that a rating system can price (then billing system includes a rating component), checking a rate for a given unit of something, defining a unit of something and associated rating rules as a combination of condition and actions, checking a balance of an account, adding credit to an account, deducting an amount from an account, registering for notification of an event on the balance of an account (e.g. notify when below a threshold), reserving an amount, crediting an amount, checking a charge history for an account, etc. It should also be noted that the billing system may handle an account as a pre-paid account, a post paid account, or a payment account (e.g. bank or credit card account).

Figure 8:
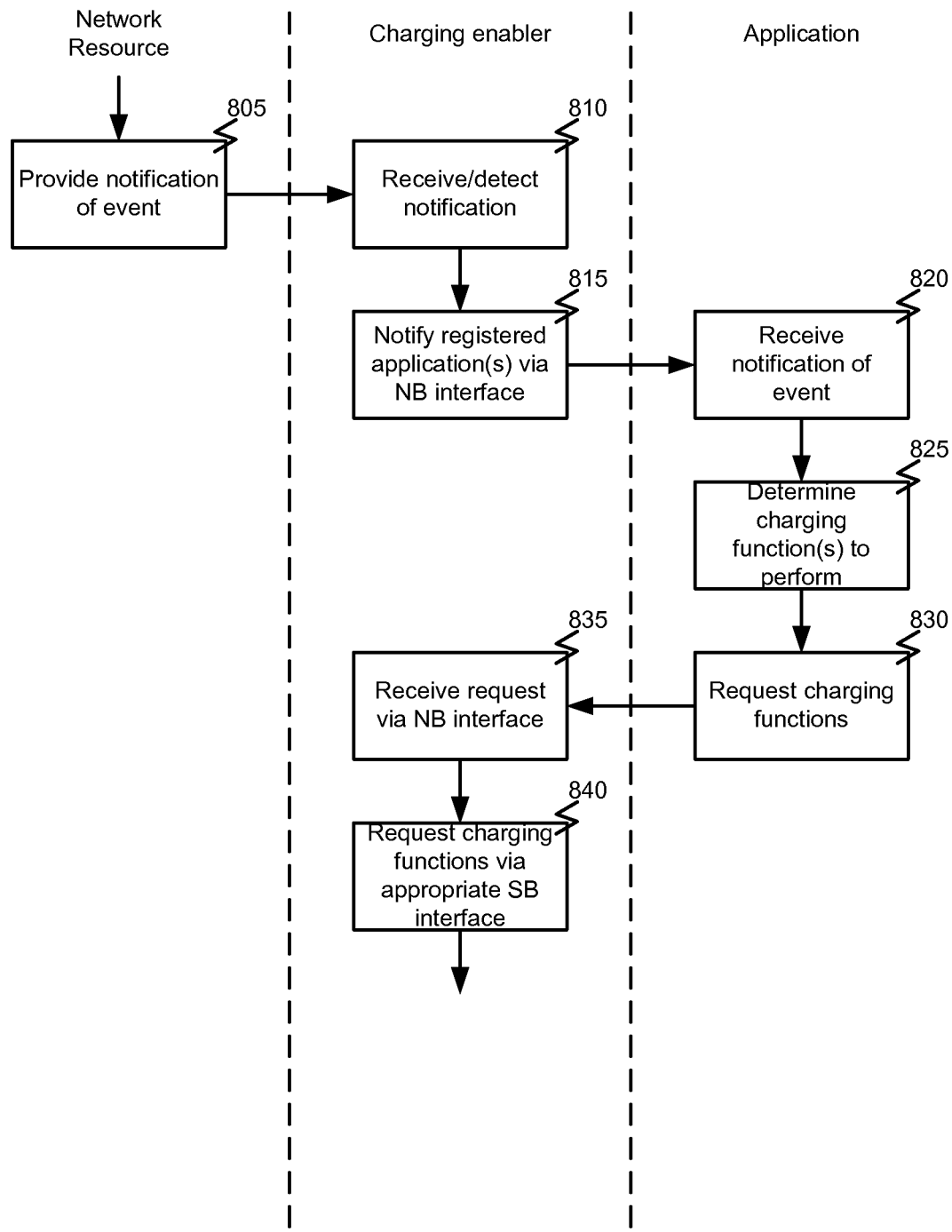
FIG. 8 is a flowchart illustrating a process for performing charging according to an alternative embodiment of the present invention.

FIG. 8 is a flowchart illustrating a process for performing charging according to an alternative embodiment of the present invention. In this case, the process can begin with a network resource detecting and providing 805 a notification of an event for which charging may be performed, e.g., initiation of a call, a request to make a payment, a request to manage an account, etc. The charging enabler detects 810 the communication, i.e., receives the notification, from the resource via the southbound interface of the charging enabler. As noted above, the request can comprise, for example a request to charge for the services provided on the communications network, manage one or more accounts, process one or more payments, perform one or more rating functions, and/or other functions, etc.

The charging enabler can in turn notify 815 one or more registered applications via the northbound interface of the charging enabler. The application(s) can in turn receive 820 the notification of the request or event from the endpoint via the northbound interface of the charging enabler. In some cases, a controlling application can determine 825 one or more charging functions to be performed in response. As noted above, the charging functions of the network resource that can be invoked or accessed through the northbound interface can include, but are not limited to, charging for the services provided on the communications network, managing one or more accounts, processing one or more payments, performing one or more rating functions, etc.

Once the charging function(s) have been determined 825 by the application, the application can request 830 one or more charging functions via the abstract northbound interface of the charging enabler. The charging enabler receives 835 the request to perform a charging function from the application via the northbound interface of the charging enabler. The charging function can in turn be requested 840 by the charging enabler from a network resource via a southbound interface of the charging enabler.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for charging for services on a communication network, the method comprising:
   receiving, at an abstraction layer of a charging enabler, a request to perform a charging function of a first billing system, wherein the first billing system is one network resource of a plurality of network resources, wherein:
      the request is received from a service-level application via a northbound interface of the charging enabler; and
      the abstraction layer of the charging enabler uses a single first network protocol to communicate with at least the service-level application from a plurality of service-level applications;
   in response to receiving the request, and at a driver layer of the charging enabler, instantiating a first instance of a driver that is specific to the first billing system, wherein the driver layer of the charging enabler comprises the first instance of the driver that is one of a plurality of instances of drivers that are specific to one or more of the plurality of network resources;
   requesting, through a network layer of the charging enabler, the charging function to be performed by the first billing system via a first southbound interface of a plurality of southbound interfaces, wherein:
      the first southbound interface uses a second network protocol that is different from the first network protocol and specific to the first billing system; and
      each of the plurality of southbound interfaces uses a network protocol that is specific to a corresponding network resource of the plurality of network resources.

2. The method of claim 1, further comprising:
   receiving results of the charging function from the first billing system via the first southbound interface of the charging enabler; and
   returning the results of the charging function to the application via the northbound interface of the charging enabler.

3. The method of claim 1, wherein the northbound interface of the charging enabler comprises an Application Program Interface (API).

4. The method of claim 3, wherein the northbound interface comprises a Simple Object Access Protocol (SOAP) API.

5. The method of claim 3, wherein the northbound interface comprises a REpresentational State Transfer (REST) API.

6. The method of claim 3, wherein the northbound interface comprises a Java API.

7. The method of claim 1, wherein the charging function comprises charging for the services provided on the communication network.

8. The method of claim 1, wherein the charging function comprises one or more account management functions.

9. The method of claim 1, wherein the charging function comprises one or more payment processing functions.

10. The method of claim 1, wherein the charging function comprises one or more rating functions.

11. The method of claim 1, wherein the first southbound interface includes a Diameter interface on a Session Initiation Protocol (SIP) network.

12. The method of claim 11, wherein the first southbound interface includes a Parlay interface.

13. The method of claim 12, wherein the first southbound interface includes an Intelligent Network (IN) interface.

14. The method of claim 1, wherein the charging function is applied to a pre-paid account.

15. The method of claim 1, wherein the charging function is applied to a post-paid account.

16. The method of claim 1, wherein the charging function is applied to a payment account.

17. A non-transitory computer-readable memory device comprising a set of instructions stored therein which, when executed by a processor, cause the processor to charge for services on a communication network by:
  receiving, at an abstraction layer of a charging enabler, a request to perform a charging function of a first billing system, wherein the first billing system is one network resource of a plurality of network resources, wherein:
    the request is received from a service-level application via a northbound interface of the charging enabler; and
    the abstraction layer of the charging enabler uses a single first network protocol to communicate with at least the service-level application from a plurality of service-level applications;
  in response to receiving the request, and at a driver layer of the charging enabler, instantiating a first instance of a driver that is specific to the first billing system, wherein the driver layer of the charging enabler comprises the first instance of the driver that is one of a plurality of instances of drivers that are specific to one or more of the plurality of network resources;
  requesting, through a network layer of the charging enabler, the charging function to be performed by the first billing system via a first southbound interface of a plurality of southbound interfaces, wherein:
    the first southbound interface uses a second network protocol that is different from the first network protocol and specific to the first billing system; and
    each of the plurality of southbound interfaces uses a network protocol that is specific to a corresponding network resource of the plurality of network resources.

18. The non-transitory computer-readable memory device of claim 17, further comprising:
  receiving results of the charging function from the first billing system via the first southbound interface of the charging enabler; and
  returning the results of the charging function to the application via the northbound interface of the charging enabler.

19. The non-transitory computer-readable memory device of claim 18, wherein the charging enabler is further configured to:
  receive an event notification from a network resource in the plurality of network resources via a southbound interface in the plurality of southbound interfaces of the charging enabler supporting the network resource, and notify the service-level application of the notification via the northbound interface of the charging enabler, and
  wherein the first southbound interface of the charging enabler specific to the first billing system and the southbound interface supporting the network resource are different.

20. The non-transitory computer-readable memory device of claim 19, wherein the service-level application is configured to:
  determine one or more charging functions to be performed in response to the notification; and
  request the one or more charging functions via the northbound interface of the charging enabler.

21. The non-transitory computer-readable memory device of claim 20, wherein the charging enabler is further configured to:
  receive the request to perform the one or more charging functions from the application via the northbound interface of the charging enabler; and
  request the charging function from the billing system via the southbound interface supporting the billing system.

22. A system comprising:
  a processor; and
  a memory coupled with and readable by the processor and storing therein a set of instructions which, when executed by the processor, causes the processor to charge for services on a communication network by:
    receiving, at an abstraction layer of a charging enabler, a request to perform a charging function of a first billing system, wherein the first billing system is one network resource of a plurality of network resources, wherein:
      the request is received from a service-level application via a northbound interface of the charging enabler; and
      the abstraction layer of the charging enabler uses a single first network protocol to communicate with at least the service-level application from a plurality of service-level applications;
    in response to receiving the request, and at a driver layer of the charging enabler, instantiating a first instance of a driver that is specific to the first billing system, wherein the driver layer of the charging enabler comprises the first instance of the driver that is one of a plurality of instances of drivers that are specific to one or more of the plurality of network resources;
    requesting, through a network layer of the charging enabler, the charging function to be performed by the first billing system via a first southbound interface of a plurality of southbound interfaces, wherein:
      the first southbound interface uses a second network protocol that is different from the first network protocol and specific to the first billing system; and
      each of the plurality of southbound interfaces uses a network protocol that is specific to a corresponding network resource of the plurality of network resources.

23. The system of claim 22, further comprising:
  receiving results of the charging function from the first billing system via the first southbound interface of the charging enabler; and
  returning the results of the charging function to the application via the northbound interface of the charging enabler.

24. The system of claim 22, wherein the northbound interface of the charging enabler comprises an Application Program Interface (API).

25. The system of claim 24, wherein the northbound interface comprises a Simple Object Access Protocol (SOAP) API.

26. The system of claim 24, wherein the northbound interface comprises a REpresentational State Transfer (REST) API.

27. The system of claim 24, wherein the northbound interface comprises a Java API.

28. The system of claim 22, wherein the charging function comprises charging for the services provided on the communication network.

29. The system of claim 22, wherein the charging function comprises one or more account management functions.

30. The system of claim 22, wherein the charging function comprises one or more payment processing functions.

31. The system of claim 22, wherein the charging function comprises one or more rating functions.

32. The system of claim 22, wherein the first southbound interface includes a Diameter interface on a Session Initiation Protocol (SIP) network.

33. The system of claim 32, wherein the first southbound interface includes a Parlay interface.

34. The system of claim 33, wherein the first southbound interface includes an Intelligent Network (IN) interface.

35. The system of claim 22, wherein the set of instructions which, when executed by the processor, causes the processor to apply the charging function to a pre-paid account.

36. The system of claim 22, wherein the set of instructions which, when executed by the processor, causes the processor to apply the charging function to a post-paid account.

37. The system of claim 22, wherein the set of instructions which, when executed by the processor, causes the processor to apply the charging function to a payment account.

* * * * *